(12) United States Patent
Rotta

(10) Patent No.: US 10,420,437 B2
(45) Date of Patent: Sep. 24, 2019

(54) MACHINE FOR THE PREPARATION OF LIQUID PRODUCTS VIA CAPSULES

(71) Applicant: LUIGI LAVAZZA S.p.A., Turin (IT)

(72) Inventor: Denis Rotta, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 131 days.

(21) Appl. No.: 15/524,460

(22) PCT Filed: Oct. 23, 2015

(86) PCT No.: PCT/IB2015/058192
§ 371 (c)(1),
(2) Date: May 4, 2017

(87) PCT Pub. No.: WO2016/071797
PCT Pub. Date: May 12, 2016

(65) Prior Publication Data
US 2018/0078083 A1    Mar. 22, 2018

(30) Foreign Application Priority Data
Nov. 6, 2014 (IT) .............................. TO2014A0922

(51) Int. Cl.
*A47J 31/40* (2006.01)
*A47J 31/36* (2006.01)

(52) U.S. Cl.
CPC ......... *A47J 31/407* (2013.01); *A47J 31/3633* (2013.01); *A47J 31/3638* (2013.01)

(58) Field of Classification Search
CPC .... A47J 31/407; A47J 31/3676; A47J 31/368; A47J 31/3695; A47J 31/3623; A47J 31/3628; A47J 31/3633; A47J 31/3638
See application file for complete search history.

(56) References Cited

U.S. PATENT DOCUMENTS 9,068,652 B2 *  6/2015 Deuber ............... A47J 31/3695
9,480,360 B2 * 11/2016 Reimondo ......... A47J 31/3633
(Continued)

FOREIGN PATENT DOCUMENTS

WO   WO 2008/014830   2/2008
WO   WO 2008/096385   8/2008
(Continued)

OTHER PUBLICATIONS

International Search Report for PCT/IB2015/058192 dated Apr. 12, 2016, 5 pages.
(Continued)

*Primary Examiner* — Eric Keasel
(74) *Attorney, Agent, or Firm* — Nixon & Vanderhye PC

(57) ABSTRACT

A machine (1) for the preparation of liquid products via capsules has a delivery assembly (2), which comprises: —a preparation chamber that includes a first, stationary, part of chamber and a second, movable, part of chamber; —an actuation system (13, 14), controllable for causing displacements of the second part of chamber with respect to the first part of chamber, between a spaced apart position and a close position; —two guide elements, configured for co-operating with a flange of a capsule for guiding the latter towards a position that is substantially coaxial to the first part of chamber and to the second part of chamber; —an ejector member (9), slidably mounted through a through opening of a bottom of the first part of chamber (4); and—connection members (8, 9a), which connect the ejector member (9) to the second part of chamber. The guide elements are prearranged for interfering with the flange of the capsule in order to extract the capsule from the housing of the first part of chamber. The connection members (8, 9a) are configured in such a way that the ejector member (9) brings about expulsion of the capsule from the housing of the first part of (Continued)

chamber if the guide elements fail to extract the capsule from the housing.

20 Claims, 19 Drawing Sheets

(56) References Cited

U.S. PATENT DOCUMENTS

| | | | | |
|---|---|---|---|---|
| 9,510,706 | B2* | 12/2016 | Tinkler | A47J 31/3633 |
| 9,661,951 | B2* | 5/2017 | Bugnano | A47J 31/3638 |
| 9,788,684 | B2* | 10/2017 | Ferrier | A47J 31/3633 |
| 2016/0157666 | A1* | 6/2016 | Brandsma | A47J 31/407 99/295 |

FOREIGN PATENT DOCUMENTS

| | | |
|---|---|---|
| WO | WO 2012/158055 | 11/2012 |
| WO | WO 2014/060932 | 4/2014 |

OTHER PUBLICATIONS

Written Opinion of the ISA for PCT/IB2015/058192 dated Apr. 12, 2016, 6 pages.
Search Report issued in EP Appln. No. 18199134.0 dated Dec. 17, 2018.

* cited by examiner

MACHINE FOR THE PREPARATION OF LIQUID PRODUCTS VIA CAPSULES

This application is the U.S. national phase of International Application No. PCT/IB2015/058192 filed Oct. 23, 2015 which designated the U.S. and claims priority to IT Patent Application No. TO2014A000922 filed Nov. 6, 2014, the entire contents of each of which are hereby incorporated by reference.

TECHNICAL FIELD

The present disclosure relates to machines for the preparation of beverages and liquid products in general by means of capsules. The invention has been developed with particular reference to delivery assemblies for machines of the type referred to.

PRIOR ART

Delivery assemblies for machines for the preparation of liquid products using capsules usually comprise a preparation chamber made up of two parts, at least one of which is movable with respect to the other. One part of the chamber is constituted by a capsule-holder, whereas the other part is constituted by an injector. Movement of at least one of the injector and the capsule-holder is obtained by means of a mechanical actuation system, which may be operated manually, via a lever, or else in an automated way, via an electric motor.

In order to enable extraction of a spent capsule from the capsule-holder it is known to use ejector members, slidably mounted in a through opening of the bottom of the capsule-holder. A delivery assembly provided with one such member is, for example, known from WO 2012/158055 A, on which the preamble of claim 1 is based.

In this solution, the capsule is initially supported in a position that is substantially coaxial to the injector and the capsule-holder via two side guides, which are fixed in motion with respect to the injector. These guides are mounted so as to divaricate in the course of advance of the injector in order to enable introduction of the capsule into the capsule-holder. Following upon introduction of the capsule into the capsule-holder, the ejector member is moved in recession directly by the body of the capsule while the latter is pushed forwards by the injector. After delivery of the liquid product, the injector is made to recede, bringing about advance of the ejector member into the capsule-holder, aimed at causing expulsion of the capsule. In the course of recession, moreover, the side guides again approach one another.

In general, the body of the capsule, except for its flange, undergoes mechanical softening owing to the high temperatures involved in preparation of the liquid product. For this reason, the bottom of the capsule, at the end of preparation, is frequently weakened, in particular also following upon tearing that the filtering tips have caused to enable outflow of the product. These conditions have an adverse effect on the action of an ejector member, since they entail, for example, application of excessive forces during opening of the assembly, and hence significant stresses on its mechanical system.

OBJECT AND SUMMARY

In its general terms, the aim of the present invention is to overcome one or more of the aforesaid drawbacks in a simple and inexpensive way. This and other aims still, which will emerge clearly hereinafter, are achieved according to the present invention thanks to a machine for the preparation of beverages and liquid products in general having the characteristics recalled in the claims. Advantageous developments of the invention form the subject of the dependent claims. The claims form an integral part of the technical teaching provided herein in relation to the invention.

BRIEF DESCRIPTION OF THE DRAWINGS

The invention will now be described, purely by way of non-limiting example, with reference to the annexed drawings, wherein.

DESCRIPTION OF PREFERRED EMBODIMENTS

Figure 1:
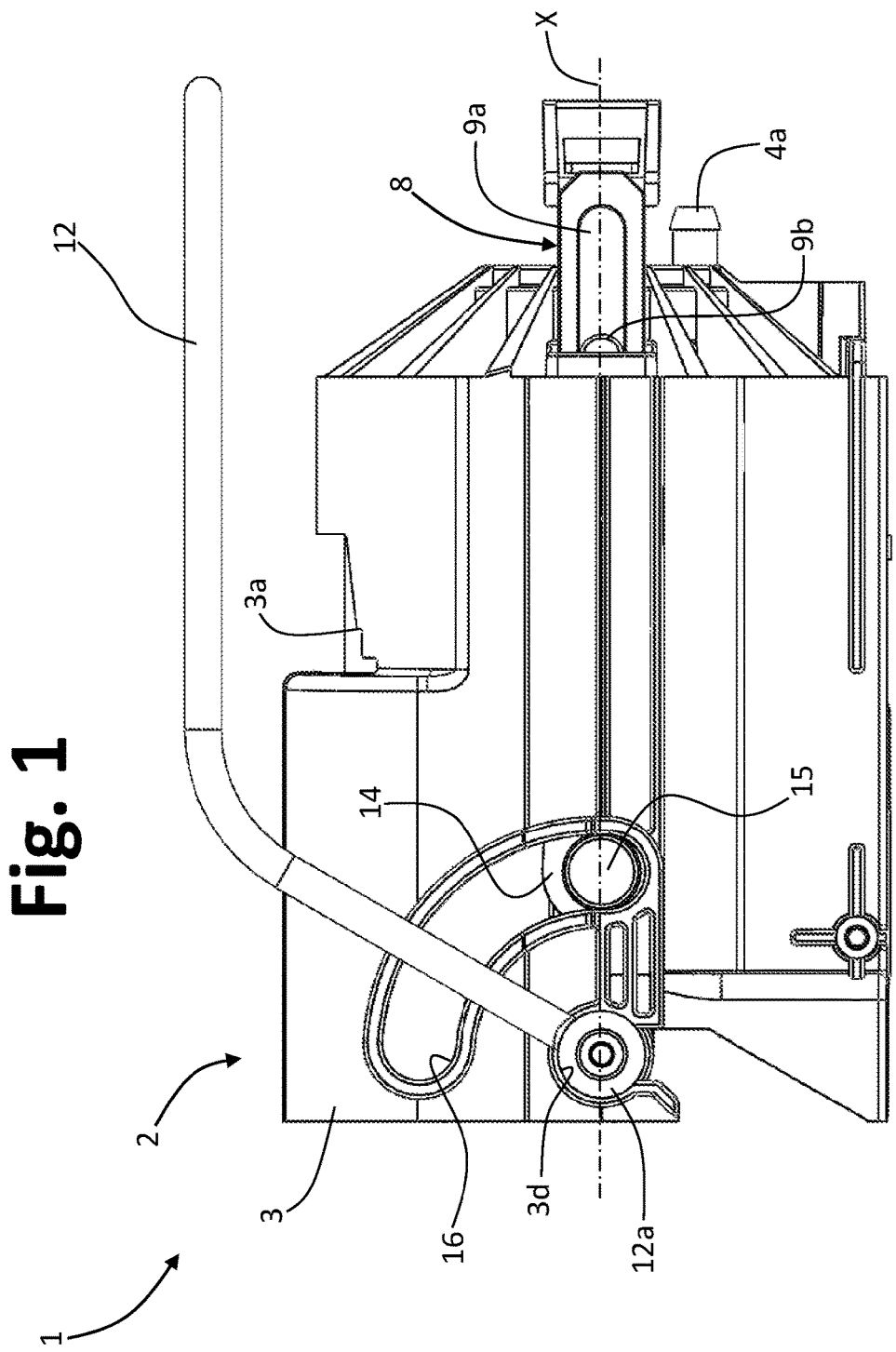
FIG. 1 is a schematic view in side elevation of a machine for the preparation of liquid products according to one embodiment of the invention.

Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" and the like that may be present in various points of this description do not necessarily refer to one and the same embodiment. Furthermore, particular conformations, structures, or characteristics may be combined in any adequate way in one or more embodiments. The references used herein are merely provided for convenience and hence do not define the sphere of protection or the scope of the embodiments.

It is moreover pointed out that the machine according to possible embodiments of the invention will be illustrated and described limitedly to some parts of a delivery assembly thereof, which constitute a specific aspect of the invention, taking for granted that associated to this assembly are all the other elements in themselves known for operation of an ordinary machine for the preparation of beverages via capsules, amongst which, for example, a water tank, an electric pump, an electric heater, a user interface, etc.

Partially and schematically represented in FIGS. 1-4 is a machine 1 for the preparation of liquid products via capsules, in particular for the preparation of coffee. The machine 1 has a delivery assembly 2 having a stationary structure or casing 3, located in which is a preparation chamber comprising two parts, at least one of which is movable e with respect to the other. In the example illustrated, the first part includes a capsule-holder 4, defining a housing configured for receiving at least partially a capsule and delivering the liquid product obtained by means thereof, and for this purpose the capsule-holder 4 has an outlet 4a of its own. In the example, the capsule-holder 4 is stationary and at least part of its structure is defined by the casing 3.

The second part of the infusion chamber comprises an injector device 5, referred to hereinafter for simplicity as "injector", configured for introducing into a capsule a preparation fluid, such as water and/or steam under pressure, supplied by means of a respective inlet 5a. In the example illustrated, the injector 5 is substantially coaxial to the capsule-holder 4 and is mounted for shifting linearly inside the casing 3 according to an axis designated by X in FIG. 1, via guides of any known conception. For instance, in one embodiment, defined on each of the two opposite sides of the casing 3 is a linear guide, and in these two guides—which are parallel to one another and with respect to the axis X of the assembly 2—respective lateral guide elements of the injector 5 are engaged, for example the ends of a pin belonging to an actuation system of the assembly 2.

The assembly 2 comprises an inlet passage and an outlet passage for the capsules and a supporting arrangement, which comprises a supporting member that is able to keep a capsule in a position substantially coaxial to the capsule-holder 4 and the injector 5. The assembly further comprises guide means, configured so as to guide a capsule as far as the aforesaid position that is substantially coaxial to the two parts of the preparation chamber 4-5.

Figure 2:
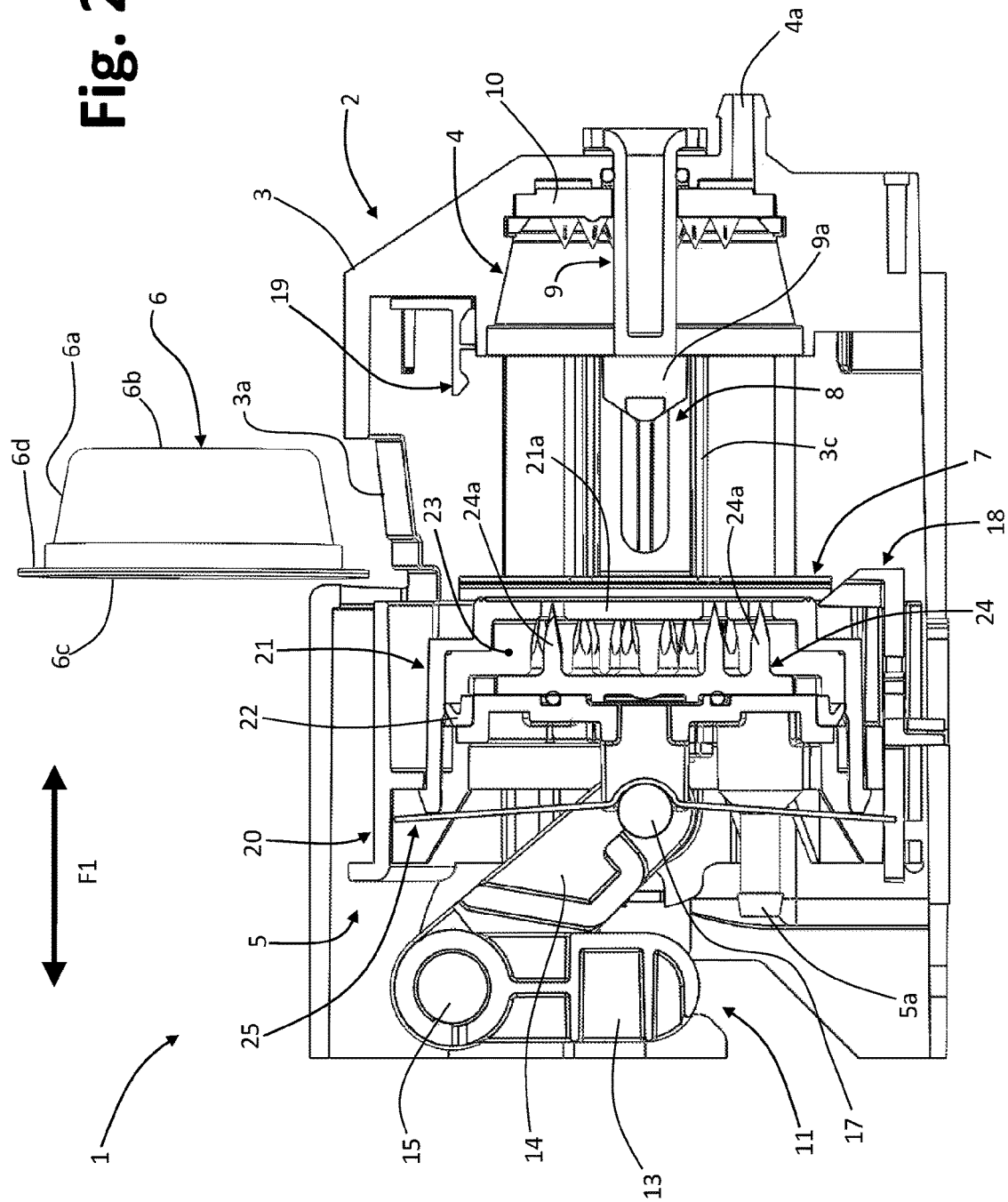
FIG. 2 is a partial and schematic longitudinal section of a machine according to one embodiment of the invention, in a first condition.
Figure 3:
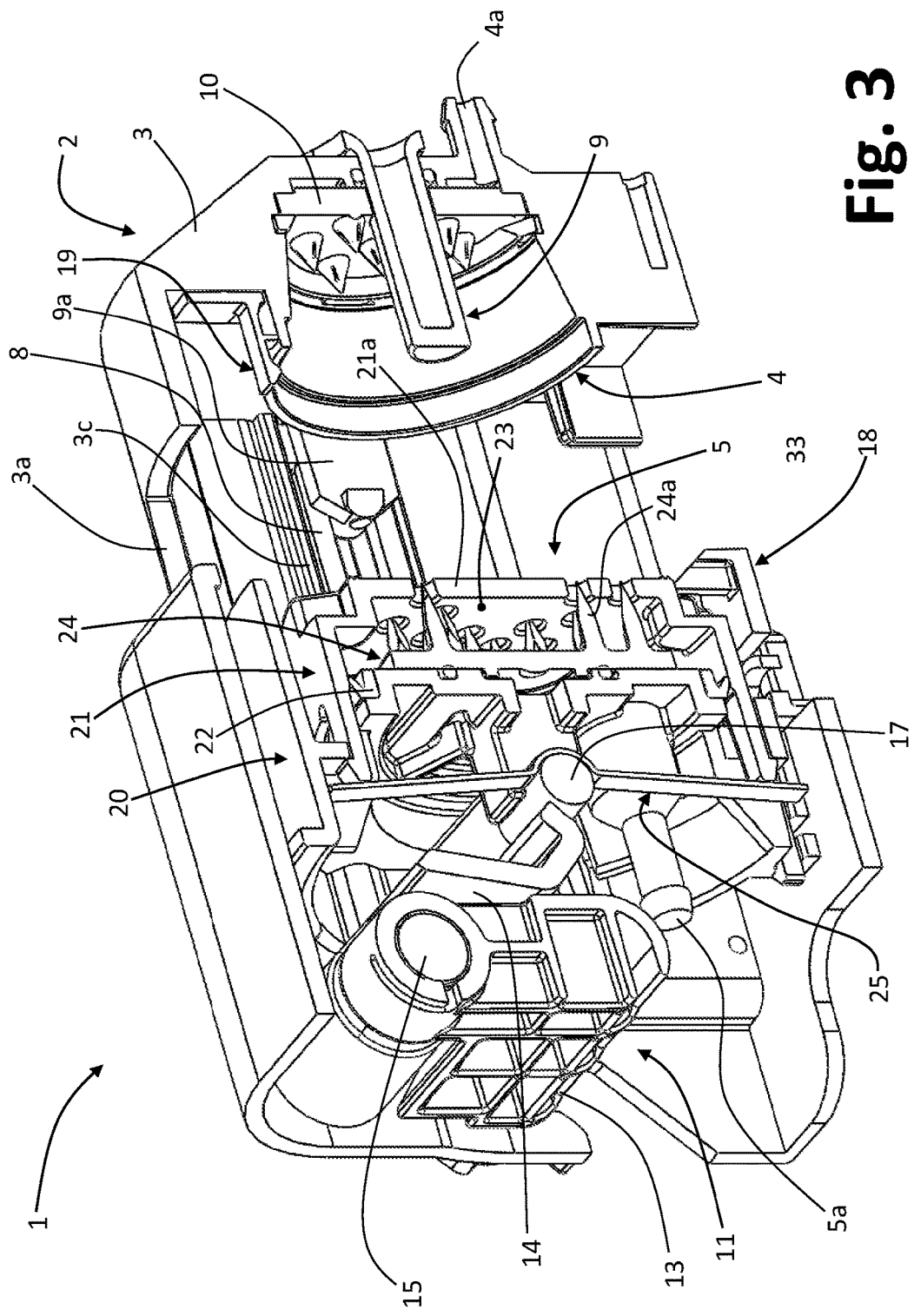
FIGS. 3 and 4 are partially sectioned schematic perspective views of the machine of FIG. 2 in the aforesaid first condition.
Figure 4:
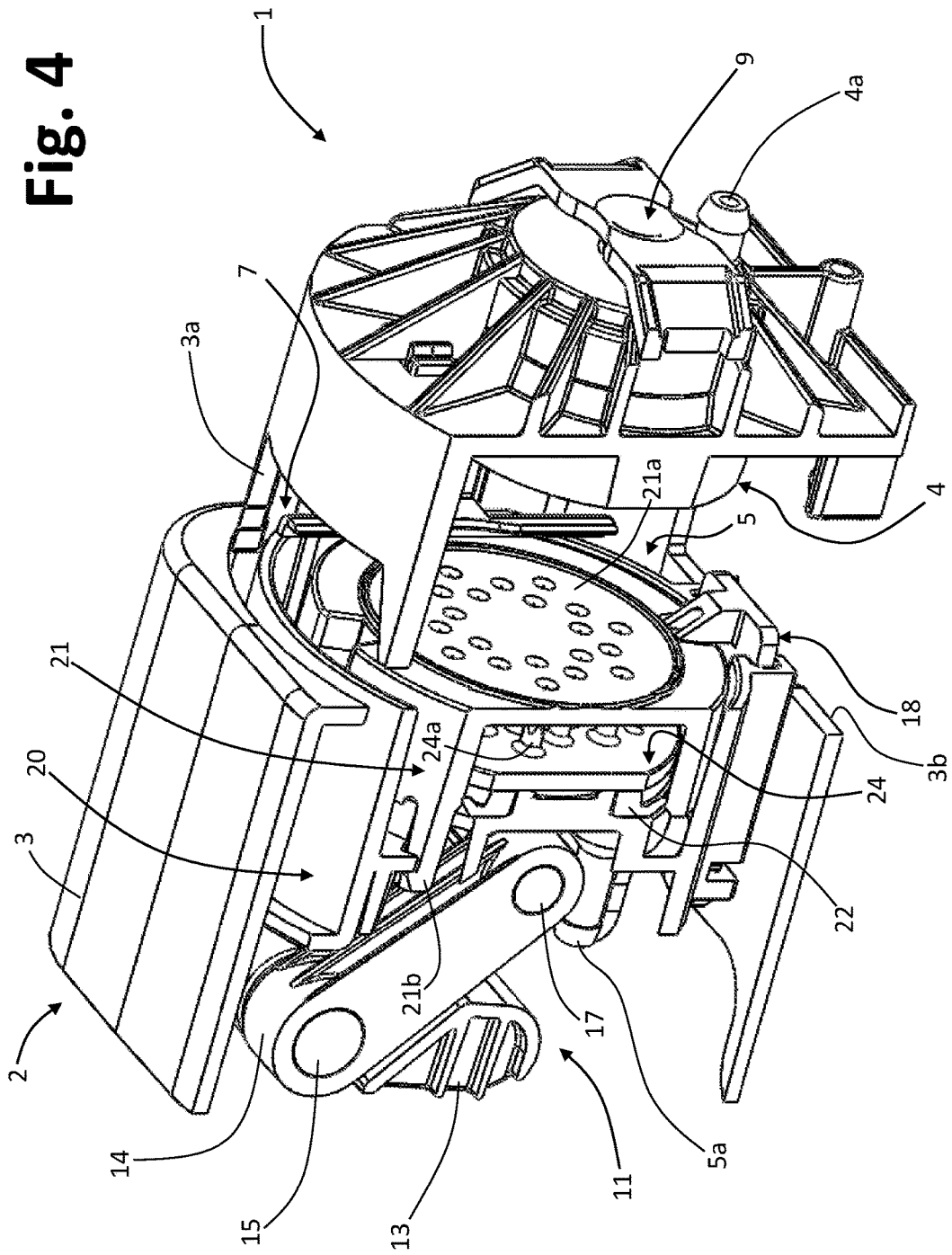

A capsule that can be used in the assembly 2 is designated by 6 in FIG. 2. In the example, the capsule 6, of a conception in itself known, has a substantially cup-shaped body, with a peripheral wall 6a and a bottom 6b, and a closing wall 6c opposite to the bottom 6b, preferably formed by a sealing foil. The body 6a defines, at its mouth opposite to the bottom 6b, a flange 6d, on which the closing wall 6c is fixed, for example via heat sealing. Housed inside the cup-shaped body is a dose of a precursor that is able to form a liquid product via a preparation fluid, in particular, water and/or steam, the precursor comprising, for example, ground coffee.

In one embodiment, such as the one exemplified in the figures, the casing 3 has, in its top part, an entry opening 3a, which provides the aforesaid inlet passage. In the example, the profile of the opening 3a substantially corresponds to the cross section of the capsule 6 so as to enable guided introduction thereof with relative precision into the assembly 2. To the opening 3a there corresponds, in the lower part of the casing 3, an opening for discharging the capsule, which is partially visible for example in FIG. 4, where it is designated by 3b.

The aforesaid guide means for the capsule are located at generally opposite side parts of the injector 5 and are configured for constraining a capsule 6 laterally. In one embodiment, the guide means comprise two generally vertical guide elements 7, which are located a little beyond the front of the injector 5, preferably at a fixed distance from one another. The elements 7, hereinafter also defined as "guides" or "vertical guides", are configured for co-operating with the flange 6d of a capsule in order to guide the latter. In one embodiment, each guide 7 has a respective first portion generally facing the front of the injector 5, at a distance therefrom so as to delimit with the latter a space for receiving the flange 6d of the capsule 6 and enabling sliding thereof. One such portion is designated by 7a, for example, in FIGS. 9, 26, 28, and 32. The insertion guides 7 are movable together with the injector 5. For this purpose, the guides 7 can be fixed to the body of the injector 5 or else be configured as distinct components, but fixed in motion with respect to the injector. In a particularly advantageous embodiment, each vertical guide 7 is fixed in motion with respect to a respective sliding element 8 (see also FIG. 5), which is engaged in a corresponding horizontal guide defined in a respective side of the casing 3; one such guide is designated, for example, by 3c in FIG. 2. The sliding elements 8 thus provide guide elements for movement of the injector 5, which are generally transverse to the guides 7. As may be appreciated, for example, in FIGS. 2 and 4, with the injector in its initial position, i.e., spaced apart from the capsule-holder 4, the insertion guides 7 are located underneath the entry opening 3a so as to be able to receive the flange 6d of the capsule 6.

The assembly 2 further includes means for expulsion of a spent capsule from the housing defined by the capsule-holder 4. In one embodiment, such as the one exemplified in the figures, these means include an ejector member 9, extended in length, for example like a stem, which is mounted displaceable through an opening provided in the bottom of the capsule-holder 4. In the example of embodiment illustrated, the member 9, hereinafter defined for simplicity as "ejector", has associated two lateral connection arms, designated by 9a (see also FIG. 5), each having a connection end slidably coupled to a corresponding element 8. In the example represented, for this purpose, the arms 9a are provided on the outer side of respective fixed pins 9b for coupling to the elements 8 fixed with respect to the vertical guides 7, as described hereinafter. The sliding elements 8 and the arms 9a, set generally parallel to one another, thus provide members for connection of the ejector 9 to the capsule-holder 4 and are able to slide through respective front slits (not shown), defined on the front of the casing 3 and axially aligned to the guides 3c. In this way, movement of the injector 5 and of the sliding elements 8 causes movement of the connection arms 9a, and hence of the ejector 9.

To the bottom wall of the capsule-holder 4 there may be associated a perforation device, comprising one or more tips or reliefs. Once again with reference to the example illustrated, one such perforation device, which is also of any known type, is designated by 10 and has a central passage for the ejector 9. Irrespective of the specific conformation of such a device 10, the liquid that flows out of the capsule 6, which is torn at the bottom by the aforesaid tips, can reach the passage 4a. The latter may be connected, for example via a suitable duct, to a nozzle for delivery of the liquid product. The invention may in any case be applied also to the case of delivery assemblies for capsules having a pre-perforated bottom wall, in which case it is not necessary to provide a perforation device inside the capsule-holder 4.

Displacement of the injector 5 in the two opposite directions indicated by the arrow F1 of FIG. 2 is obtained by means of an actuation system, designated as a whole by 11. In various embodiments, the actuation system 11 comprises a mechanism substantially of a toggle type or a mechanism comprising a rocker and at least one connecting-rod member, for example one that may be operated manually by a user via a purposely provided lever, of the same type as the one designated by 12 in FIG. 1. In other embodiments, the actuation mechanism may include gears or an electric driving motor. Also the actuation system 11 may in fact be of any type known in the sector.

In one embodiment, such as the one exemplified in the figures, the actuation system 11 includes a rocker 13, i.e., a transmission member constrained to an oscillation between two fixed positions. In the example, a first connection portion of the rocker 13 includes two lateral pins 13a, coaxial to each other, which are fixed in rotation with respect to the rocker itself. The pins 13a are designed to be rotatably constrained in respective rotation seats 3d, one of which may be seen, for example, in FIG. 1, defined in the two opposite side walls or sides of the casing 3, there being associated to the pins of the rocker 13 the ends 12a of the lever 12. The rocker 13 is articulated to a connecting-rod member 14 via a pin 15, movable in arched guide slits defined on the two opposite sides of the casing 3, one of which is designated by 16 in FIGS. 1 and 5. The connecting-rod member 14 is constrained, via a second pin 17, to the body of the injector 5. The axes of rotation of the actuation system 11 defined by the pins 13a of the rocker 13 and by the pins 15 and 17 are hence substantially perpendicular to the direction of linear displacement F1 of the injector 5 with respect to the capsule-holder 4.

Figure 5:
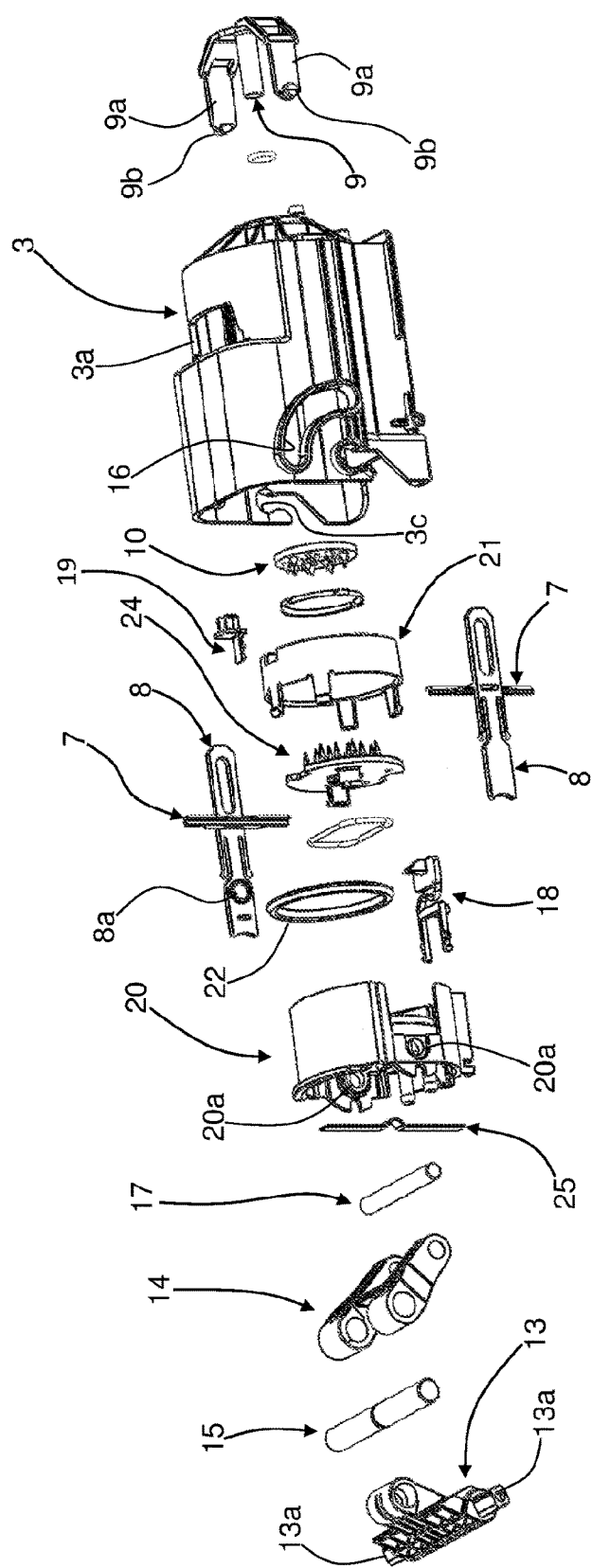
FIG. 5 is an exploded schematic view of some parts of a delivery assembly of a machine according to one embodiment of the invention.

In the example of embodiment illustrated, the two opposite ends of the pin 17 project on opposite sides of the body of the injector 5, with the latter that is constrained to a linear reciprocating movement within the casing 3, between its spaced apart position and its close position with respect to the capsule-holder 4. For this purpose, as has been mentioned, the linear guides 3c are provided, which are configured, for example, in the form of rectilinear recesses on the inside of the side walls of the casing 3. In a preferred embodiment, each end of the pin 17 is coupled to one of the sliding elements 8, which are purposely provided with a corresponding seat 8a (FIG. 5). In this way, via the actuation system 11 the linear movements of the injector 5, of the guides 7, and of the ejector 9 can be brought about.

Figure 6:
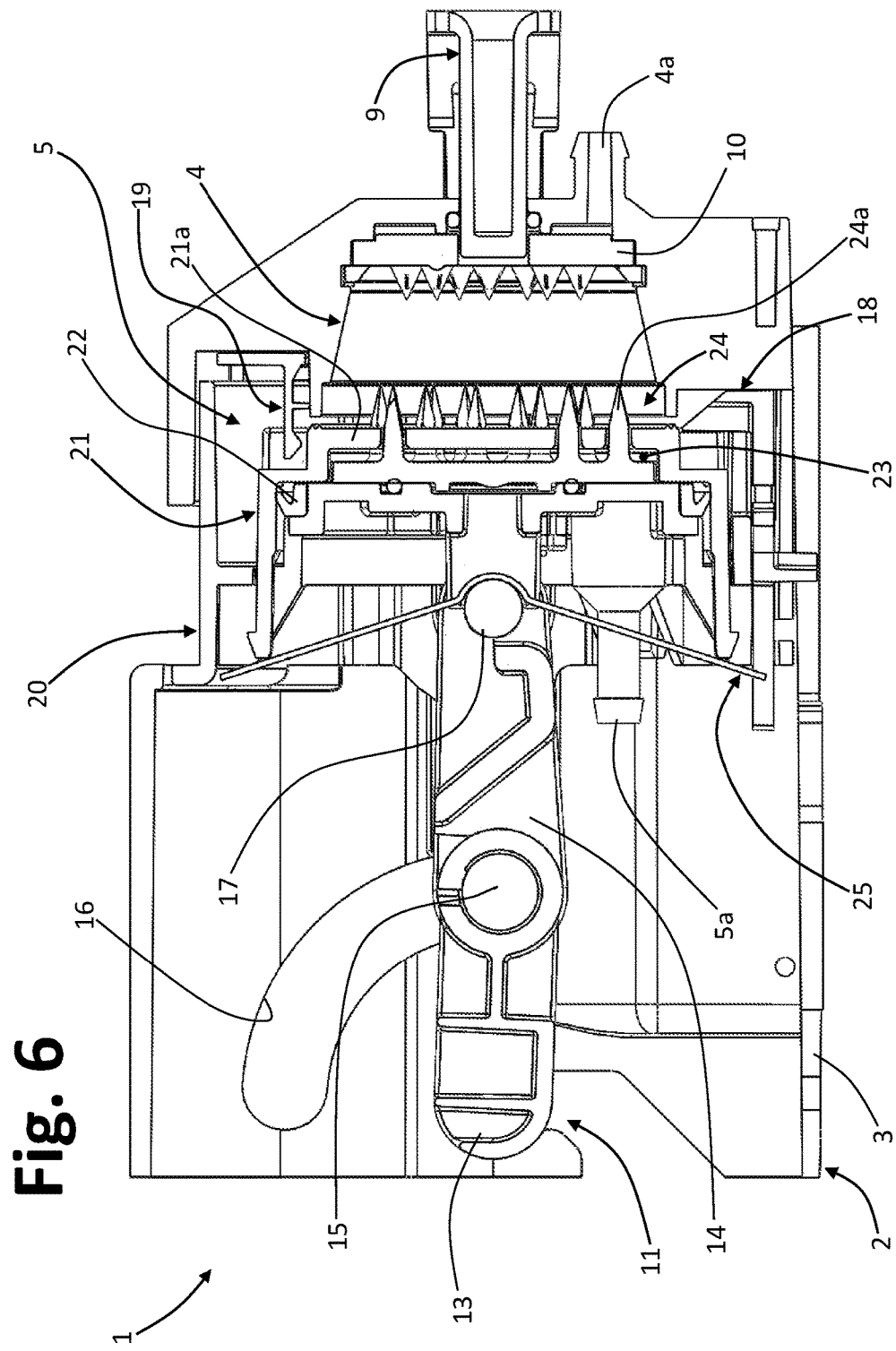
FIGS. 6 and 7 are views similar to those of FIGS. 2 and 3, with the machine in a second condition.
Figure 7:
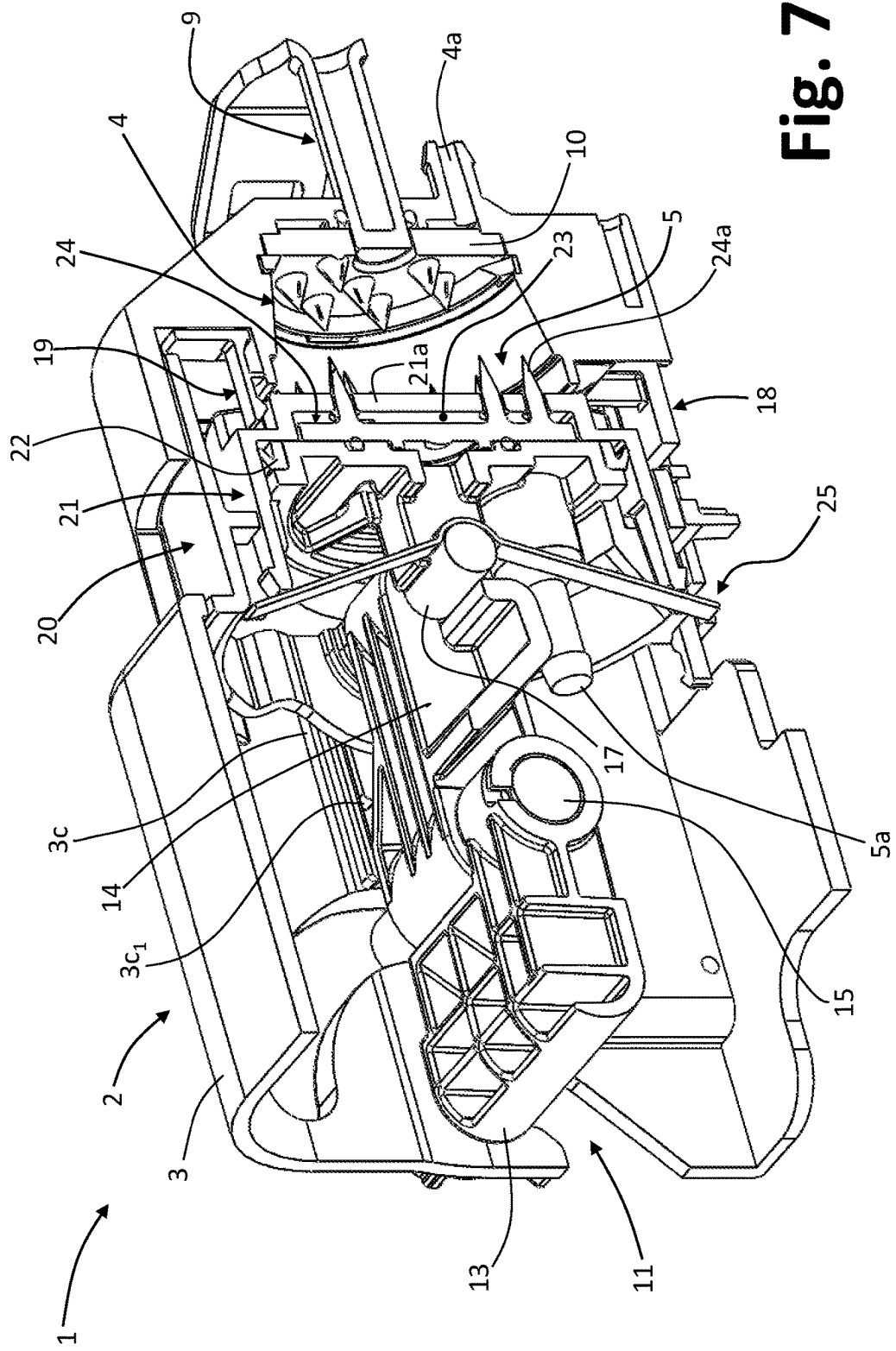

Provided at the lower part of the injector 5, preferably in a central position, is the aforementioned supporting member, designated as a whole by 18. Operation of this member is substantially similar to what is described in WO 2012/168917 A, filed in the name of the present applicant, to which the reader is referred. Here it is sufficient to point out that the supporting member 18 is mounted on the injector 5 so as to be able to slide between an advanced position, visible for example in FIGS. 2-4, and a retracted position, visible for example in FIGS. 6-7. The advanced position is maintained by the member 18 during advance of the injector 5 towards the capsule-holder 4. In this step, the flange 6d of the capsule 6 (FIG. 2) rests on the member 18 in order to be kept, also with the aid of the vertical guides 7, in a position that is substantially coaxial to the capsule-holder and the injector. In the course of advance of the injector 5, when the capsule is already introduced into the capsule-holder 4, a first part of the supporting member 18 interferes mechanically with a first fixed stop, thereby being moved into its retracted position. This retracted position is maintained in the course of the subsequent movement of the injector towards its initial position, at a distance from the capsule-holder so as not to constitute a hindrance to dropping of the spent capsule into the outlet passage 3b, as described hereinafter. Just before the initial position of the injector 5 is reached, a second part of the supporting member 18 interferes mechanically with a second fixed stop, thereby being brought again into its advanced position, ready for receiving a new capsule.

In one embodiment, the assembly 2 comprises at least one retention element operative in a position corresponding to a generally upper area of the capsule-holder 4. In the example illustrated, one such retention element is designated by 19 and is set in a fixed position in an upper part of the capsule-holder 4, i.e., in a position generally opposite to the lower supporting member 18. In one embodiment, the retention element 19 has a lower engaging tooth, with which the flange 6d of a capsule 6 may interfere mechanically in the course of advance of the injector 5 towards the capsule-holder 4, as described hereinafter.

With reference, in particular, to the embodiment illustrated in FIGS. 2-5, the injector 5 has a generally hollow body that includes at least one first body part 20 and one second body part 21, which is axially slidable with respect to the first body part 20, the two parts being mounted preferably in a substantially telescopic way with a sealing member 22 set in between. In the example illustrated in the figures, the axis of sliding between the body parts 20 and 21 substantially corresponds to the axis X of displacement of the injector 5 with respect to the capsule-holder 4. In what follows, for simplicity, the parts 20 and 21 will be defined as "injector body" and "lid", respectively. In one embodiment, such as the one exemplified, the injector body 20 is approximately cylindrical and has, on two opposite sides, circular through seats 20a (FIG. 5), which can be engaged by the pin 17 connected to the connecting-rod member 14. Also the lid 21 has a substantially cylindrical hollow shape, with an end wall 21a that basically provides a front wall of the injector 5.

The general structure of the injector may be of any type known in the sector, and for this reason will not be described in detail. In the non-limiting example illustrated, defined between the injector body 20 and the lid 21 is a chamber 23, at least partially housed in which is a perforation device, designated as a whole by 24, having a plurality of front perforating elements that are axially aligned to respective through holes defined in the front wall 21a of the lid 21. The lid 21 is able to slide, against the action of elastic means, from an advanced position (visible in FIGS. 2-4) to a retracted position (visible in FIGS. 6-7). In an advantageous embodiment, such as the one illustrated in the figures, the aforesaid elastic means comprise a bending spring 25, in particular a flat or leaf spring, which extends in a direction transverse to the direction of axial sliding X of the lid 21 with respect to the injector body 20. In the aforesaid advanced position of the lid 21 (see FIGS. 2-4), the tips 24a of the perforation device 24 do not project substantially beyond the front wall 21a of the lid. Instead, in the aforesaid retracted position (see FIGS. 6-7), the tips 24a project in a substantial way beyond the wall 21a in order to be able to perform their perforating function. On the other hand, the inventive aspects described hereinafter can be applied also to delivery assemblies provided with an injector 5 without a perforation device, for the production of machines designed to operate with capsules having a pre-perforated front wall.

As will emerge more clearly hereinafter, according to one aspect of the invention, the connection members represented by the sliding elements 8 and by the arms 9a are configured in such a way that the ejector 9 will cause expulsion of the capsule 6 from the capsule-holder if the guides 7 fail to extract the capsule.

Figure 8:
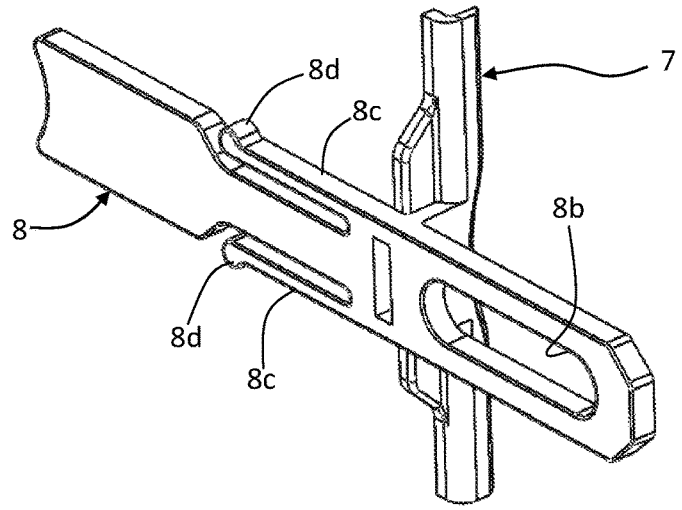
FIG. 8 is a schematic perspective view of a component of a delivery assembly of a machine according to one embodiment of the invention.

Visible in isolation in FIG. 8 is one of the guides 7 with a corresponding sliding element 8, here made of a single piece, for example of plastic material. The guide 7 extends vertically in an intermediate position of the sliding element 8, which has in its front part a slot 8b for coupling to a respective lateral arm 9a of the ejector (see FIG. 5). In an advantageous embodiment, the elements 8 and the corresponding slide guides 3c are configured for defining a position of arrest of the injector 5, corresponding to a predefined position of maximum opening thereof with respect to the capsule-holder 4. For this purpose, in the embodiment illustrated, each sliding element 8 includes at least one elastic engagement element that is able to co-operate with a corresponding recess or stop defined along the slide guides 3c. With reference to FIG. 8, the element 8 includes two elastically deformable cantilever portions or tabs 8c, an upper one and a lower one, each defining an engagement relief 8d normally projecting beyond the upper edge or lower edge, respectively, of the sliding element. These reliefs 8d are able to co-operate with corresponding contrast elements or stops—one of which is designated by $3c_1$ in FIG. 7—defined by the slide guides 3c, in a position such that, to the position of the engagement element there corresponds the aforesaid predefined position of maximum opening. In the course of movement of the injector 5, and hence of the sliding elements 8, the tabs 8c are in an elastic pre-loading condition, due to the contact between the top of the reliefs 8d with the upper and lower surfaces of the guides 3c. In this way, when during recession of the injector 5 the latter reaches the aforesaid predefined position, the elastic reaction of the tabs 8c enables engagement of the reliefs 8d with the corresponding stops $3c_1$, thereby preventing any undesirable movement of the actuation system 11.

Figure 9:
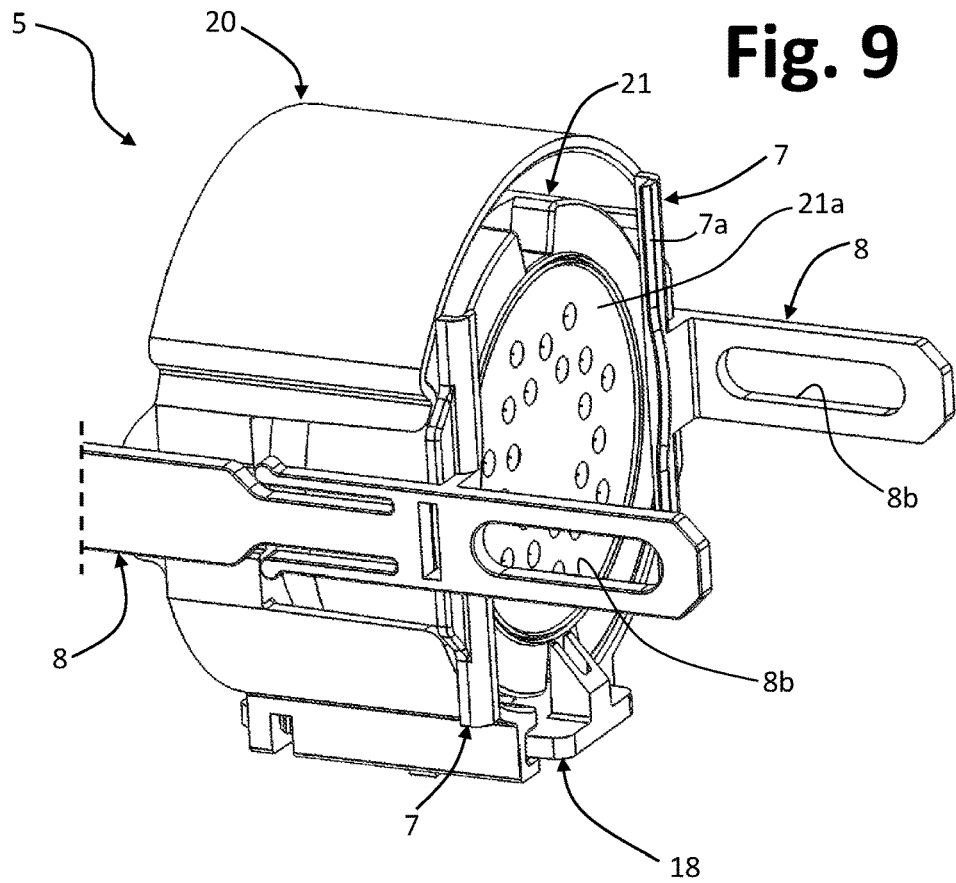
FIG. 9 is a partial and schematic perspective view of the component of FIG. 8 associated to an injector assembly.

Illustrated in FIG. 9 is the assembled condition between the injector 5 and the ensemble formed by the vertical guides 7 and by the sliding elements 8 fixed with respect to one another. As explained, in one embodiment, the elements 8, and hence the guides 7, are constrained to the body of the injector 5 through the pin 17, here not visible, the opposite ends of which project laterally from the body 20 of the injector 5 and are engaged in the corresponding seats 8a provided on the inner sides of the sliding elements 8 (see FIG. 5). In the assembled condition, the guides 7, which preferably have a substantially L-shaped cross section, are positioned a little beyond the front wall 21a of the lid of the injector 5, with a first portion 7a thereof (see, for example, FIGS. 28 and 32) generally facing the aforesaid wall 21a. In this way, a sliding space is delimited for the flange 6d of the capsule 6.

Figure 10:
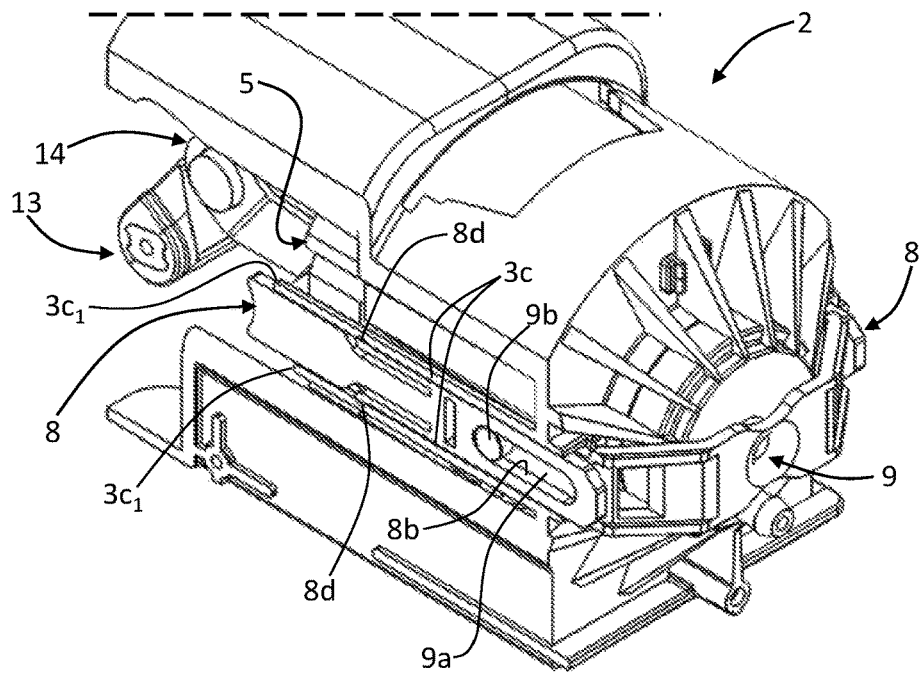
FIGS. 10-13 are partial and schematic perspective views of a delivery assembly of a machine according to one embodiment of the invention, in different operating conditions.

As has been mentioned, in the assembled condition of the assembly 2, the lateral connection arms 9a of the ejector are coupled to the sliding elements 8. With reference, for example, to FIG. 10, this coupling is obtained thanks to engagement of the fixed pin 9b of each arm in the slot 8b of the corresponding sliding element 8. FIG. 10 illustrates an instant subsequent to operation of the actuation system of the assembly 2, in which the injector 5 is already advancing. In this condition, the pins 9b of the arms 9a of the ejector 9 are in contact with the proximal or initial ends of the slots 8b of the sliding elements. Consequently, in this way, advance of the injector 5, and hence of the elements 8, causes advance of the ejector 9, i.e., its recession into the capsule-holder 4. From FIG. 10 it may moreover be noted how, in the embodiment exemplified, the contrast elements $3c_1$ for the engagement reliefs 8d of the elements 8 may be constituted by the same initial ends of the slide guides 3c.

Figure 11:
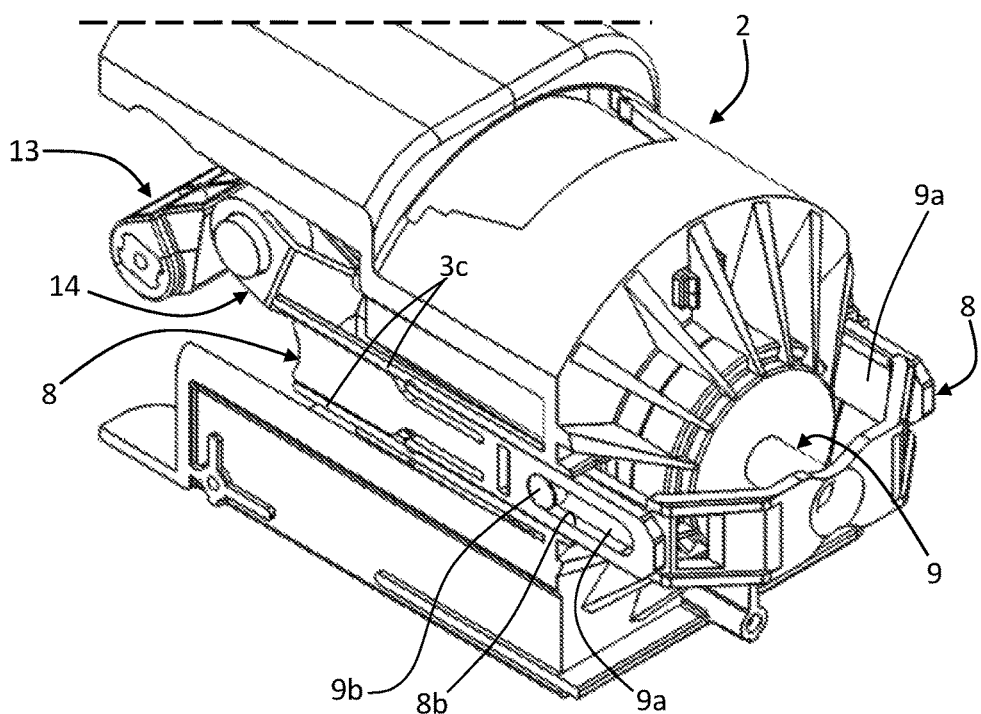

FIG. 11 illustrates a subsequent instant of advance of the injector 5 towards the close position relative to the capsule-holder. The pins 9b of the arms 9a of the ejector 9 are always in contact with the initial end of the slots 8b of the elements 8, as in FIG. 12, which illustrates the position of maximum advance of the injector 5 and hence of maximum recession of the ejector 9 into the capsule-holder.

As may be seen, according to the solution proposed, recession of the ejector 9 is determined directly and exclusively by the actuation system of the assembly 2, i.e., without the ejector having to be pushed backwards owing to the presence of the capsule each time carried by the injector towards the capsule-holder. In this way, a more precise and softer actuation of the assembly is guaranteed. It is hence to be emphasized how, in a preferred embodiment, the actuation system of the ejector (the sliding elements 8, namely, the corresponding slots 8b, the arms 9a, the ejector 9, the capsule-holder 4, and the travel of advance of the injector 5) are parameterized in such a way that, during the travel of advance of the injector the ejector does not come into contact with the bottom 6b (FIG. 2) of the capsule 6 loaded into the assembly 2.

Figure 12:
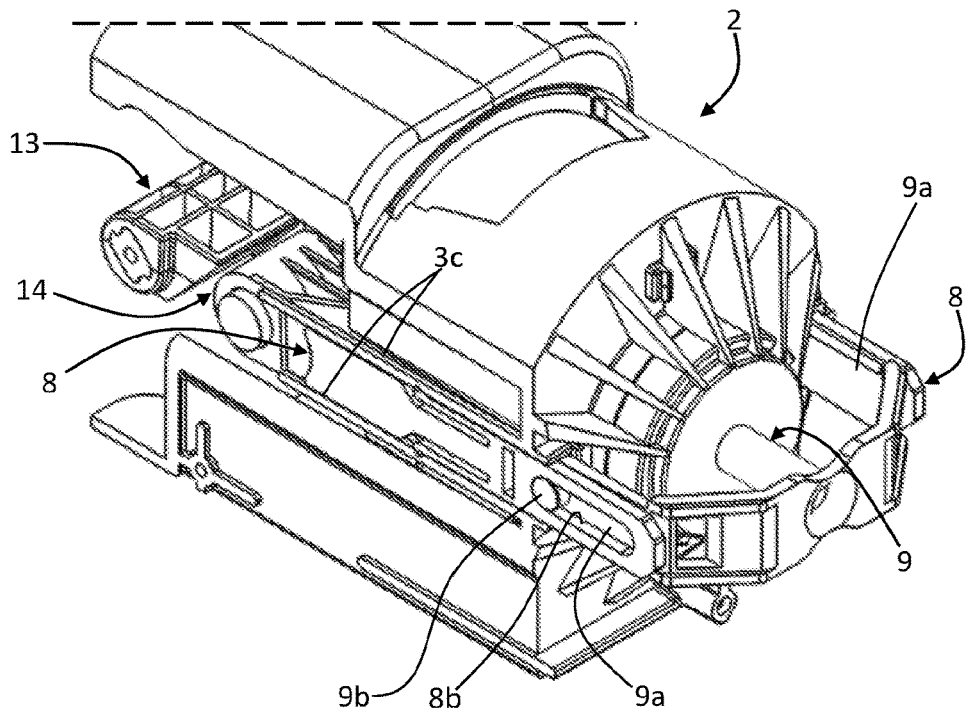
Figure 13:
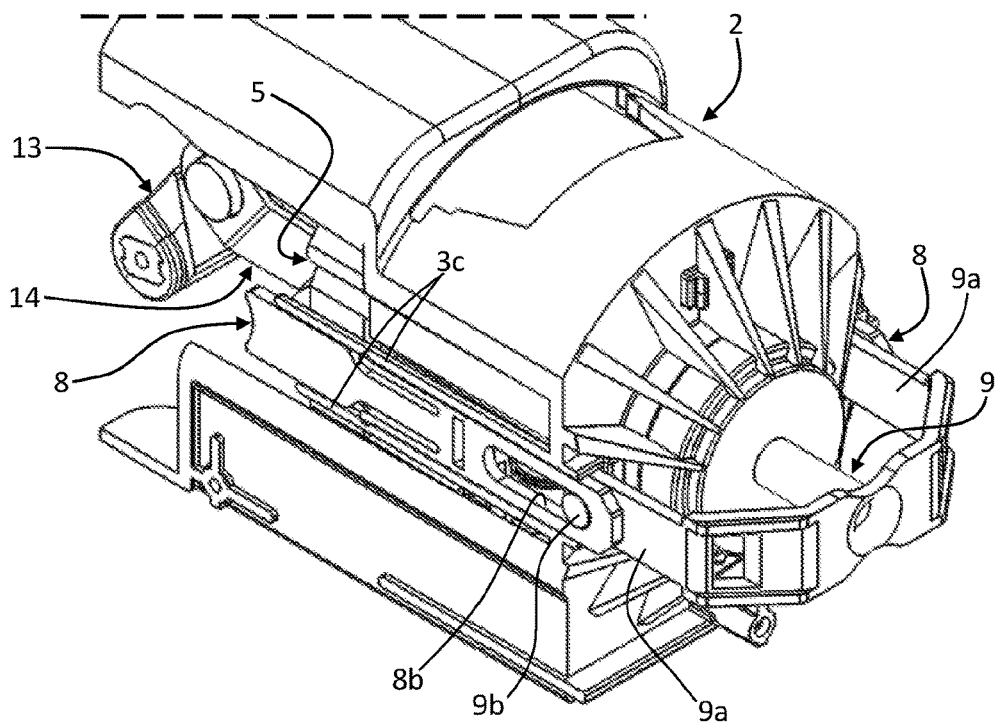

Starting from the position of FIG. 12, after preparation and delivery of the liquid product, which occurs with modalities in themselves known, the actuation system of the assembly is operated in a direction opposite to the previous one in order to bring the injector 5 back towards its initial position, of maximum distance from the capsule-holder 4. In the course of this displacement there is first determined a movement of recession of the sliding elements 8, without, however, this causing a corresponding recession of the arms 9a and hence of the ejector 9. This is allowed thanks to the slidable coupling of the pins 9b of the arms 9a in the slots 8b of the elements 8. At a certain point of the recession of the injector 5, and hence of the sliding elements 8, the distal or bottom ends of the slots 8b reach the pins 9b of the arms 9a, and starting from this moment the movement of the ejector, i.e., its advance into the capsule-holder, starts. FIG. 13 illustrates precisely this condition, which occurs in the course of return of the injector 5 towards its initial position of complete opening of the preparation chamber.

As may be seen, the connection ends represented by the pins 9b of the arms 9a are coupled to the elements 8 for sliding between two limit positions, determined by the ends of the slot 8b. In the first limit position, the elements 8 exert a thrust on the arms 9a in the course of displacement of the injector 5 towards the capsule-holder 4, thereby bringing the ejector 9 into the corresponding retracted position. In the second limit position, the elements 8 exert, instead, a traction or tensile force on the arms 9a, in the course of displacement of the injector 5 towards the spaced apart position with respect to the capsule-holder 4, thereby pulling the ejector member 9 into the corresponding advanced position. In particular, the distance between the two aforesaid limit positions is such that the ejector brings about forced expulsion of the capsule 6 from the capsule-holder only if the guides 7 fail to extract the capsule, as will emerge clearly hereinafter.

In FIGS. 3-13, the capsule introduced into the assembly 2 is not represented for reasons of greater clarity of the drawings. An example of possible operation of the assembly will now be summarized with reference to FIGS. 14-21, where a capsule 6 has been represented (in these figures, the different conditions of bending of the spring inside the injector are not highlighted).

Figure 14:
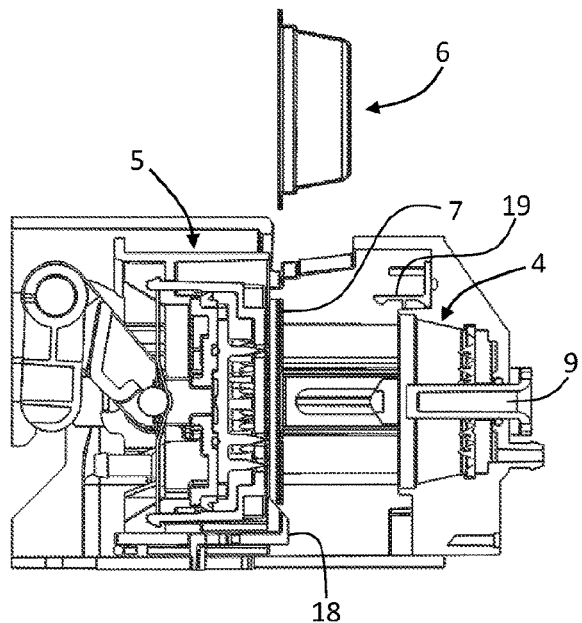
FIGS. 14-21 are schematic cross-sectional views of a delivery assembly of a machine according to one embodiment of the invention, in different operating conditions of an operating cycle.
Figure 15:
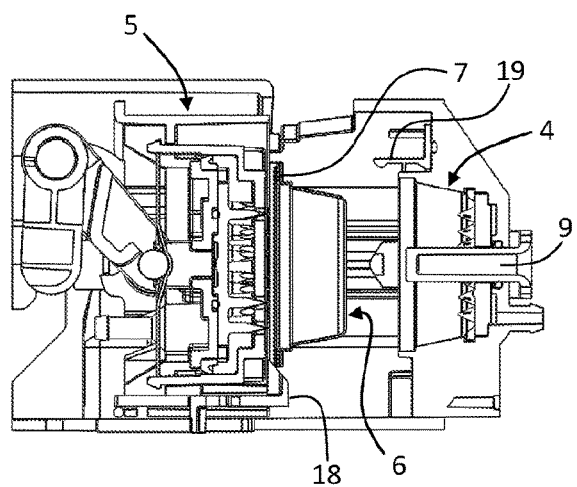
Figure 16:
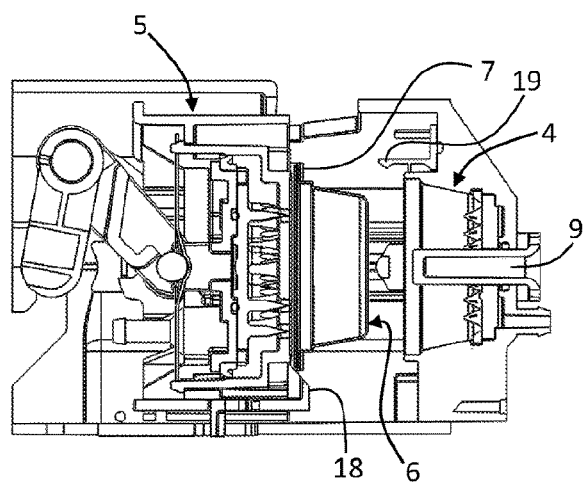
Figure 17:
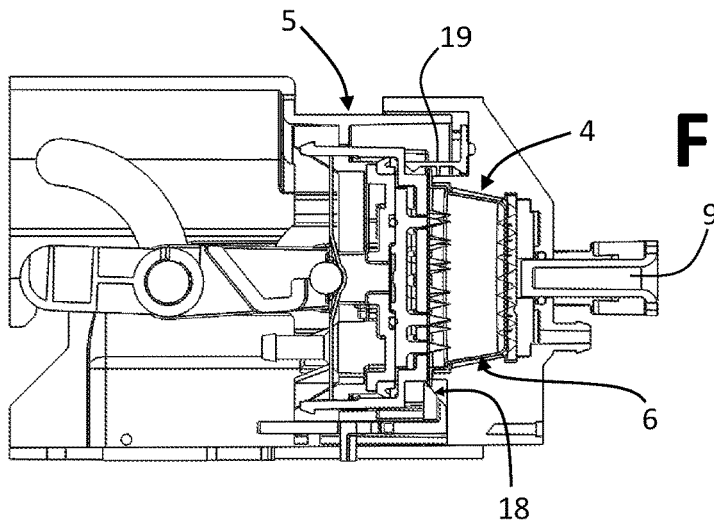
Figure 18:
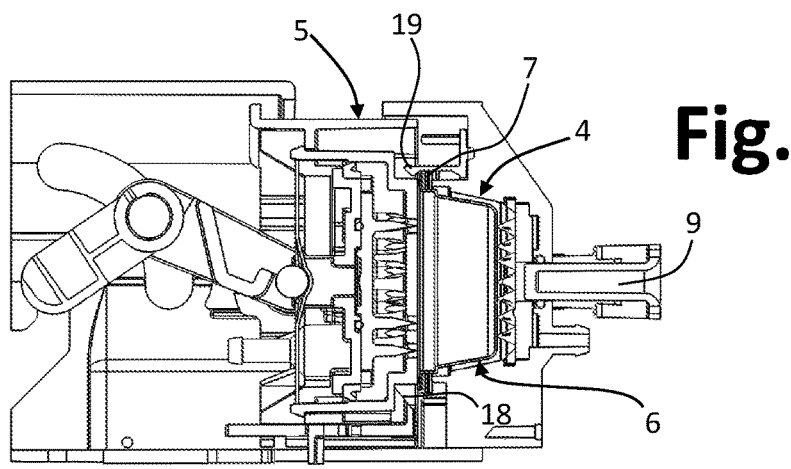
Figure 19:
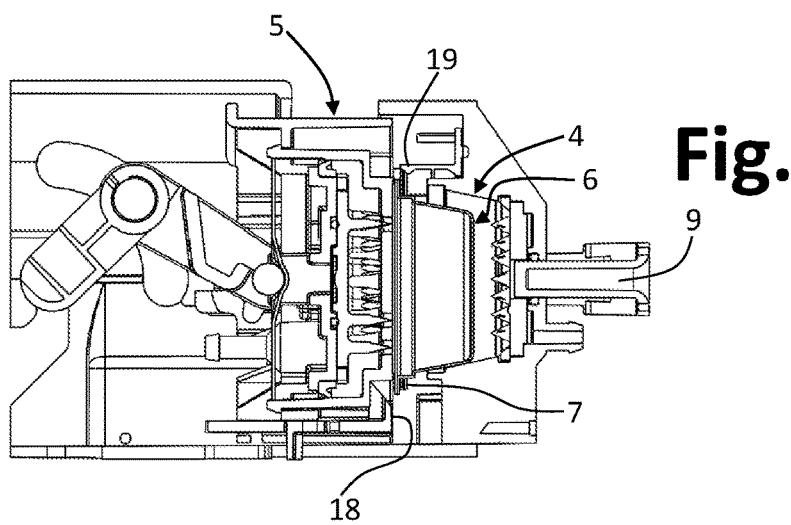
Figure 20:
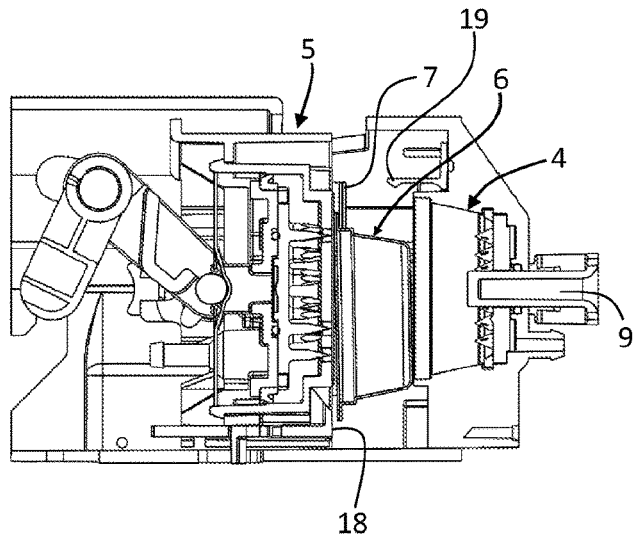
Figure 21:
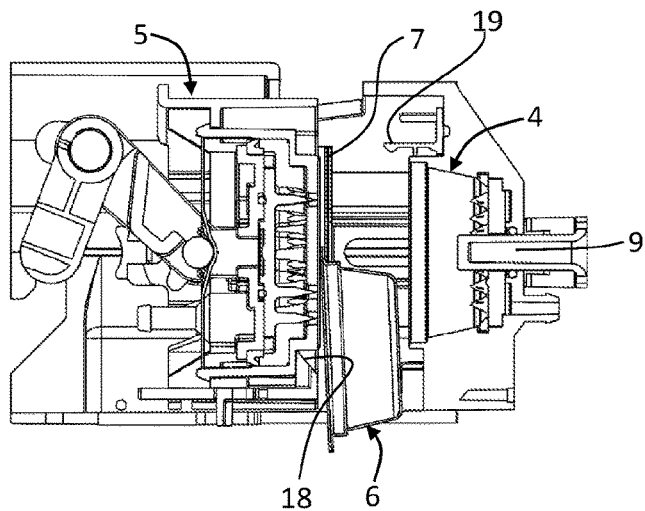

FIG. 14 exemplifies the step of insertion of the capsule 6 into the assembly 2, with the injector 5 in the spaced apart position with respect to the capsule-holder 4 and with the lower supporting member 18 in an advanced position. The capsule 6 inserted in the assembly 2 is taken up by the insertion guides 7 until the position that is substantially coaxial to the injector and the capsule-holder is reached. In this condition, a lower part of the flange of the capsule 6 rests on the member 18, as may be seen in FIG. 15. Next, the actuation system is operated for bringing the injector into the close position relative to the capsule-holder, with the capsule still supported by the member 18 and by the guides 7 in a position that is substantially coaxial to the injector and the capsule-holder, as in FIG. 16. In the course of advance of the injector 5, the member 18 interferes with a front stop element (not shown), thereby passing into its retracted position. Also the front of the injector 5 recedes following upon contact with the front of the capsule 6 when this can no longer proceed into the capsule-holder 4. FIG. 17 illustrates the end-of-travel position of advance of the injector. It may be noted that, in the course of advance of the injector 5, there is a corresponding recession of the ejector 9 into the capsule-holder 4, for the reasons explained previously, without, however, the front of the ejector coming into contact with the bottom of the capsule. It is to be noted moreover that at least one of the capsule-holder 4 and/or the guides 7 is shaped for enabling passage of the guides beyond the front edge of the capsule-holder in the course of displacement of the injector 5. In other words, then, the guides 7 are designed to overcome, as they advance, the front edge of the capsule-holder 4, thereby also enabling introduction of the capsule into the capsule-holder.

Prior to reaching of the position of FIG. 17, i.e., of closing of the preparation chamber, an upper part of the flange of the capsule 6 comes into contact with the retention element 19, in particular with its lower tooth. The retention element 19 may be indifferently stiff or else yielding. In the case of a stiff element 19, following upon interference between the flange and the aforesaid tooth, the capsule 6 tends to shift slightly downwards, in particular on an inclined upper surface of the support 18, passing beyond the tooth. In the case, instead, of a yielding retention element 19, the latter bends slightly so that the flange of the capsule can advance.

After preparation of the liquid product, which occurs with modalities in themselves known, the actuation system is operated in a direction opposite to the previous one. The injector 5 recedes towards the spaced apart position with respect to the capsule-holder 4, with the front of the injector that can return into the respective advanced position. In this way, the member 18 is housed in a corresponding front recess of the injector (not shown), as may be seen for example in FIGS. 18 and 19, which show successive moments of the movement of return of the injector 5 towards its initial position.

The spent capsule 6 is extracted from the capsule-holder 4 via the guides 7, which are purposely shaped, or else, in particular conditions explained hereinafter, by means of the ejector member 9 that starts to advance into the capsule-holder. It should be noted that, in the condition illustrated in FIG. 20, the member 18 is still in the retracted position. In the cases where the capsule 6 is extracted from the capsule-holder 4 via the guides 7, the capsule is then free to slide by gravity along the guides themselves, towards the discharge outlet of the assembly, without its fall being hindered by the member 18.

In the course of recession, the supporting member 18 then interferes with a rear stop element (not shown) so that, as the movement of the injector 5 proceeds, the member itself has moved again into its advanced condition, as may be seen in FIG. 14.

In the step of opening of the preparation chamber 4-5, then, the spent capsule is guided to exit from the capsule-holder thanks to the action of the guides 7 and of the retention element 19. Given the retracted condition of the lower supporting member 18, the capsule can thus drop by gravity into the outlet passage 3b of the assembly 2. The solution proposed hence envisages intervention of the insertion guides 7 as main and primary method for extraction of the capsule in so far as, in various embodiments, the movement of the ejector 9 is delayed with respect to the movement of recession of the injector 5, when the guides 7 have already been able to carry out extraction of the capsule 6 from the capsule-holder 4.

The front sealing foil of the capsule may occasionally stick to the front of the injector, thus not enabling subsequent dropping by gravity. In such a circumstance, the presence of the retention element 19 enables imposition on the capsule of a slight movement downwards, i.e., creation of a sliding motion between the front surface of the injector 5 and the sealing foil, which causes detachment between the parts. It will be appreciated in fact that, in the course of recession of the guides 7, the flange of the capsule will come into contact with the lower tooth of the retention element. In the absence of the lower support provided by the member 18, which is now in a retracted position, the interference between the tooth of the element 19 and the flange enables the aforesaid slight movement downwards to be imposed upon the capsule, which is sufficient to cause detachment of the sealing foil from the front of the injector.

It is also possible that, following upon preparation and delivery of the liquid product, the capsule will undergo deformation or be excessively weakened, as explained previously, i.e., in such a way that the guides 7 do not manage to extract the capsule from the capsule-holder 4. In these situations, in practice, the capsule remains jammed within the capsule-holder in such a way that recession of the guides 7 only brings about a deformation of the flange, without managing to extract the capsule from the capsule-holder.

In these conditions, the ejector 9 hence intervenes, which, as explained previously, advances in the capsule-holder 4, but only starting from a certain point of the movement of recession of the injector. This delay in the movement of the ejector with respect to that of the capsule-holder is determined by the presence of the slots 8b of the sliding elements 8, as explained previously with reference to FIGS. 10-13. After the bottom of the slots 8b has reached the pins 9b of the lateral arms 9a of the ejector 9 (see FIG. 13), further recession of the injector 5 thus causes advance of the ejector 9, which first comes into contact with the bottom of the spent capsule and then pushes it out of the capsule-holder 4. The capsule can then drop by gravity into the outlet passage of the assembly 2.

As may be seen, the solution proposed envisages intervention of the insertion guides 7 as principal method for extraction of the capsule. Only in the case where, following upon preparation of the liquid product, softening of the capsule 6 were so substantial as to partially affect also the flange 6*d*, may it happen that the guides 7 override the flange itself during recession of the injector 5 from the capsule-holder 4. Hence, only in this case would there be interaction between the bottom 6*b* of the capsule 6 and the front part of the ejector 9. As has been said, intervention of the ejector is delayed with respect to the movement of recession of the injector 5 when the guides 7 have extracted or attempted to extract the capsule 6 from the capsule-holder 4.

Figure 22:
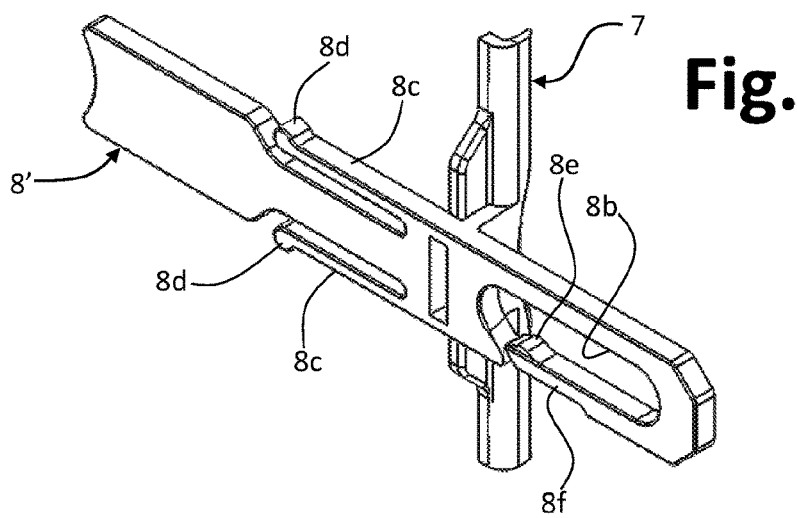
FIG. 22 is schematic perspective view of a variant embodiment of the component of FIG. 8.

FIG. 22 illustrates a possible variant embodiment, whereby the slots 8*b* of the sliding elements, here designated by 8', have an intermediate elastic engagement element 8*e* in order to define a predetermined position of the fixed pins 9*b*, and hence of the arms 9*a* of the ejector 9, with respect to the elements 8'.

In the example shown, the slots 8*b* are open, i.e., delimited on one of their longitudinal sides, by an elastically deformable cantilever portion 8*f*, which carries the engagement element 8*e*, here in the form of a roughly rounded projection, at its edge facing the inside of the slot. The projection 8*e* is in the proximity of the initial end of the slot 8*b*, in particular at a distance such that the fixed pin 9*b* of the respective lateral arm of the ejector 9 is positioned between the end of the slot 8*b* and the projection 8*e*.

Figure 23:
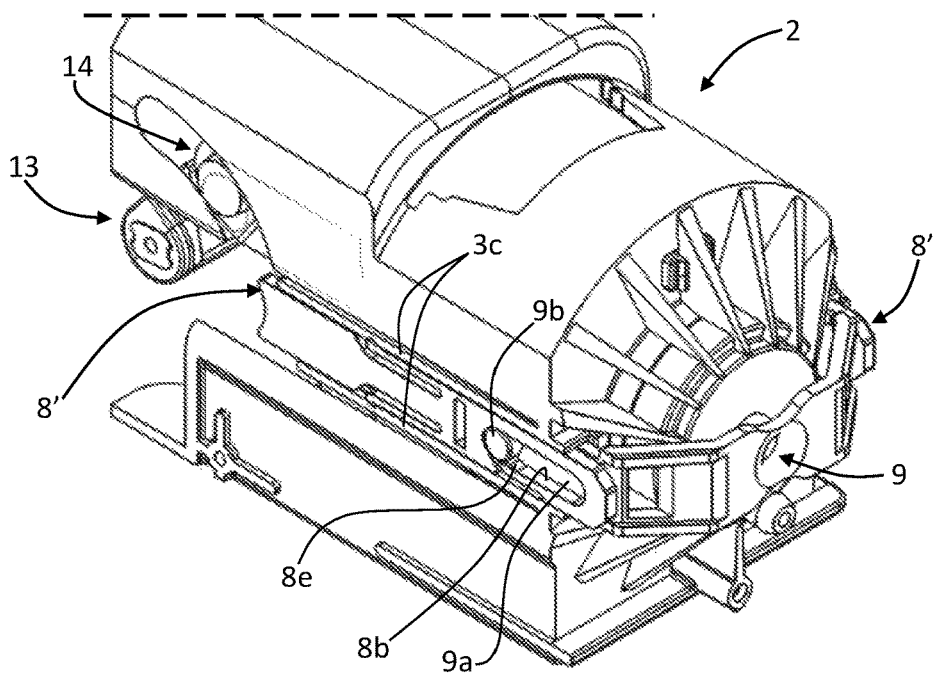
FIGS. 23-24 are partial and schematic perspective views of a delivery assembly of a machine according to one embodiment that uses the component of FIG. 22.
Figure 24:
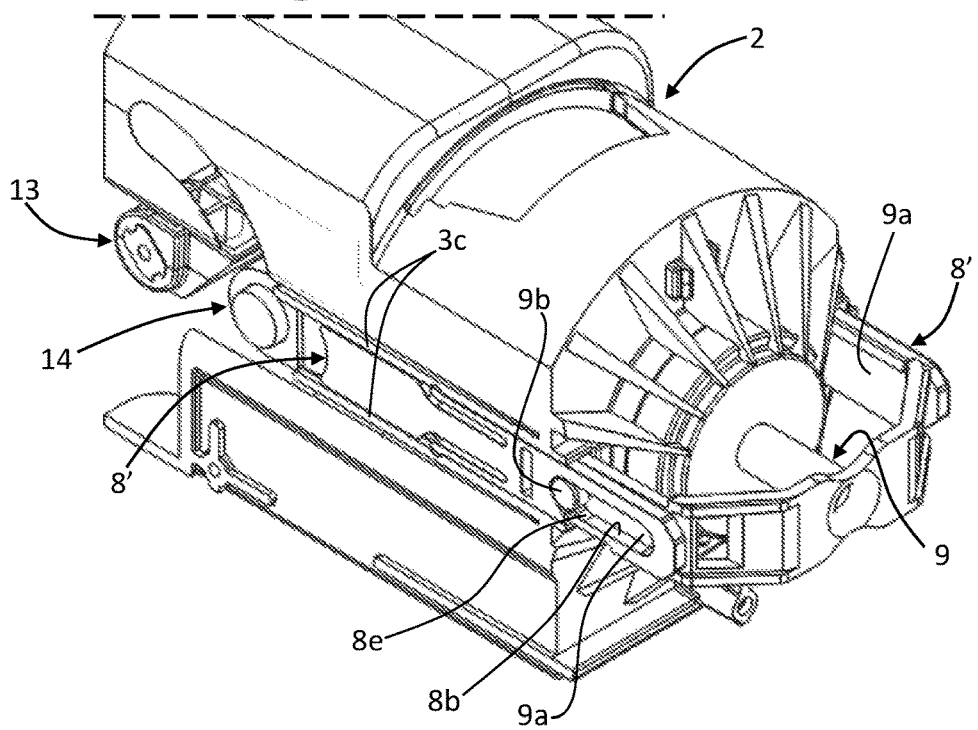

In the step of closing of the preparation chamber, i.e., in the course of advance of the injector towards the capsule-holder, the presence of the projection 8*e* has practically no effect given that the pins 9*a* bear upon the initial end of the slot 8*b*, as exemplified in FIG. 23, which represents an intermediate moment of advance. FIG. 24 illustrates, instead, reaching of the position where the injector and the capsule-holder are close to one another, i.e., the position of maximum advance of the former with respect to the latter. As may be appreciated, starting from this position and already at the start of the movement of recession of the injector, the ejector 9 is moved towards the inside of the capsule-holder, given the condition of coupling between the pins 9*b* and the projections 8*e*, as shown in FIG. 24. Consequently, in this embodiment, exit of the capsule from the capsule-holder is guided in a practically simultaneous way by the guide 7 and by the ejector 9. This solution is advantageous in co-operation with capsules that are particularly subject to the phenomenon of softening in so far as the mechanical stresses involved in extraction of the capsule 6 from the chamber 4 are distributed practically evenly between the guides 7 and the ejector 9.

This mode of operation occurs when the capsule 9 can in any case be extracted owing to the action of the guides 7. Instead, in the case mentioned above of excessive deformation or softening of a spent capsule inside the capsule-holder, the action of extraction is carried out by the ejector 9. In this condition, in the course of recession of the injector, the ejector comes into contact with the bottom of the capsule. Any further advance of the ejector is then countered by the body of the capsule, which causes release of the elastic engagement element 8*e*-8*f*. Basically, as the movement proceeds, the pins 9*b* of the arms 9*a* of the ejector 9 are urged against the projections 8*e*. In this way, elastic deformation of the cantilever portions 8*f* of the sliding elements 8 is caused, with the projections 8*e* that thus slide underneath the pins 9*b*, which at a certain point come into contact with the bottom of the slots 9*b*. Starting from this point, as the movement of the injector proceeds, the ejector 9 starts to push the spent capsule forcefully out of the capsule-holder.

Figure 25:
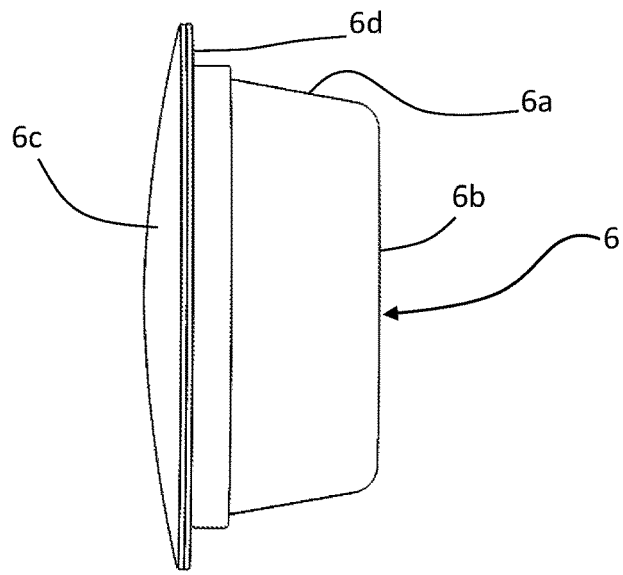
FIG. 25 is a schematic representation of a capsule in an anomalous condition assumed following upon preparation a liquid product.

During use of the machine 1, it is also possible, following upon preparation a liquid product, for a spent capsule not to undergo any significant deformation, but there to occur, instead, excessive swelling of its sealing foil 6*c* on the corresponding flange 6*d*, which may amount to a few millimeters. This can cause jamming of the flange 6*d* of the capsule in the corresponding guide means 7. This condition of swelling of a capsule 6 is exemplified in FIG. 25.

In order to tackle this problem, according to an aspect of the invention, which is in itself independently inventive, the assembly 2 envisages further means for bringing about a momentary increase of the distance between the front of the injector 5 and the portions of constraint 7*a* of the guides 7 facing it in the course of displacement of the injector 5 from the position where it is set close to the capsule-holder 4 to the position where it is set at a distance therefrom. These means in general envisage at least one elastic element that co-operates with a member for connection of the injector to the guides 7, as well as at least one corresponding engagement element provided along the slide guides of the injector.

Figure 26:
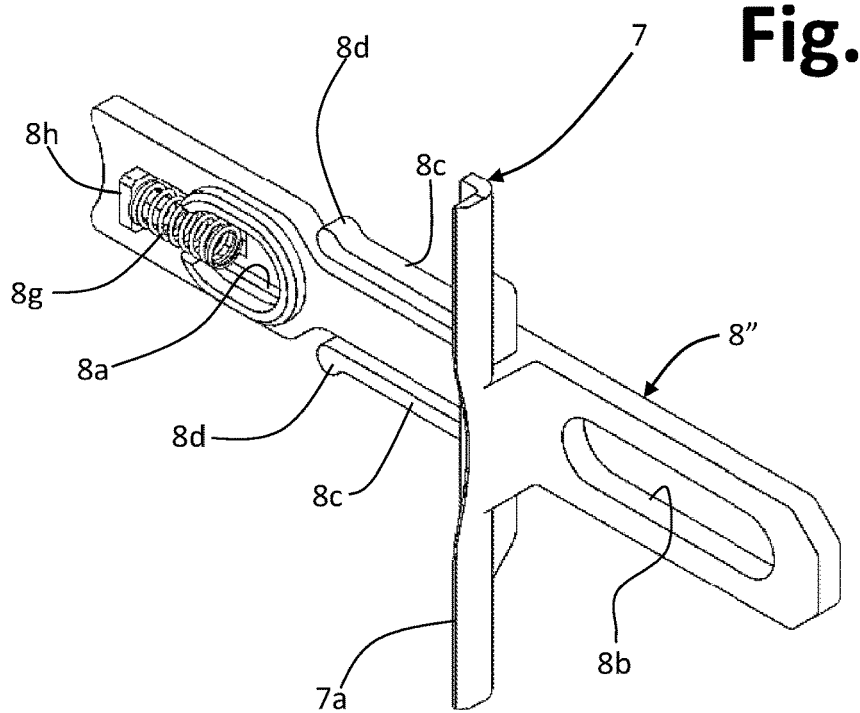
FIG. 26 is a schematic perspective view of a variant embodiment of the component of FIG. 8.

FIG. 26 illustrates an embodiment where each sliding element, here designated by 8", has, associated to the respective engagement seat 8*a*, an elastic element that, as will be seen, co-operates with a respective end of the pin 17 to enable a temporary variation of the distance between a corresponding vertical guide 7 and the front of the injector 5. In the embodiment illustrated, the seat 8*a* has a generally oblong shape in the axial direction of the sliding element, and at its distant end, with respect to the guide 7, has a passage for the elastic element, here represented by a helical spring 8*g*. One end of the spring 8*g* bears upon a corresponding contrast element 8*h* defined on the inside of the sliding element 8*a*, whereas the opposite end is designed to bear upon the pin 17, the end of which is inserted in the seat 8*a*. This assembled condition is visible in FIG. 27. It should be noted that in FIGS. 27-28 and 30-33, representation of the body of the injector 5 has been omitted for reasons of clarity.

Figure 27:
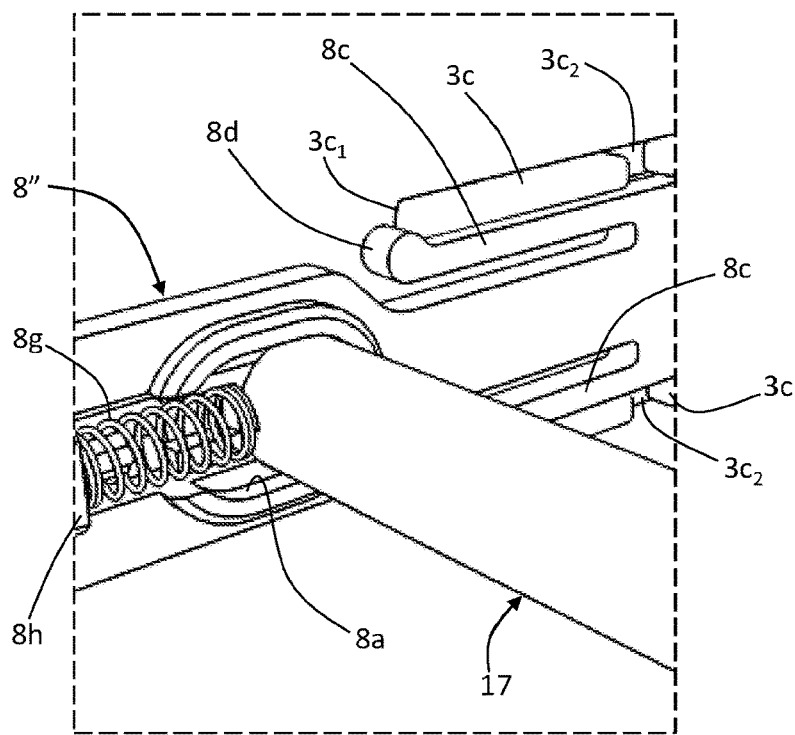
FIGS. 27-33 are partial and schematic representations of parts of a delivery assembly that uses the component of FIG. 26, in different operating steps.
Figure 28:
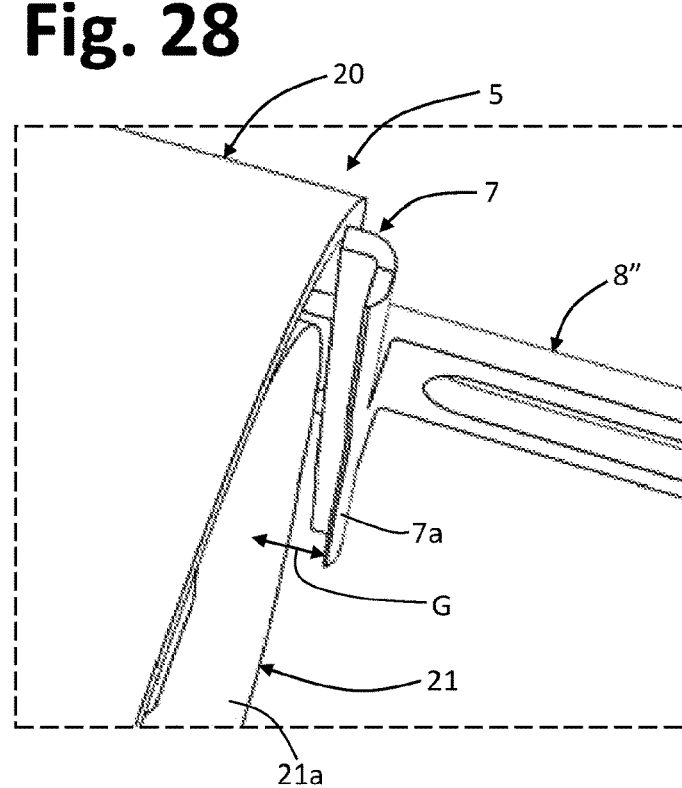

In this embodiment, the guides 3*c* for the elements 8" have, in a position corresponding to at least one of the upper edge and the lower edge, an interruption or recess, designated by $3c_2$ in FIG. 27. This interruption can be engaged by the engagement relief 8*d* of a respective tab 8*c* (see the previous description with reference to FIG. 8). As may be appreciated from FIG. 27, the spring 8*g* tends to push the sliding element 8" backwards, i.e., with the end of the seat 8*a* opposite to the spring in contact with the pin 17. In the condition of preparation with the chamber open, as has already been explained, the reliefs 8*d* of the tabs 8*c* are engaged at the proximal ends $3c_1$ of the guides 3*c* to guarantee holding of the mechanism in position. In this condition, the front portion of the guides 7 and the front wall 21*a* of the injector 5 are at a minimum pre-set distance, as may be seen in FIG. 28, where this distance is designated by G (it should be noted that, for greater clarity, in FIGS. 28 and 32 the holes of the wall 21*a* are not represented). The distance G is chosen so as to enable proper insertion and positioning of the capsule 6. The guides 7 moreover guarantee centring of the capsule, at least as far as entry of the capsule 6 into the housing of the capsule-holder.

Figure 29:
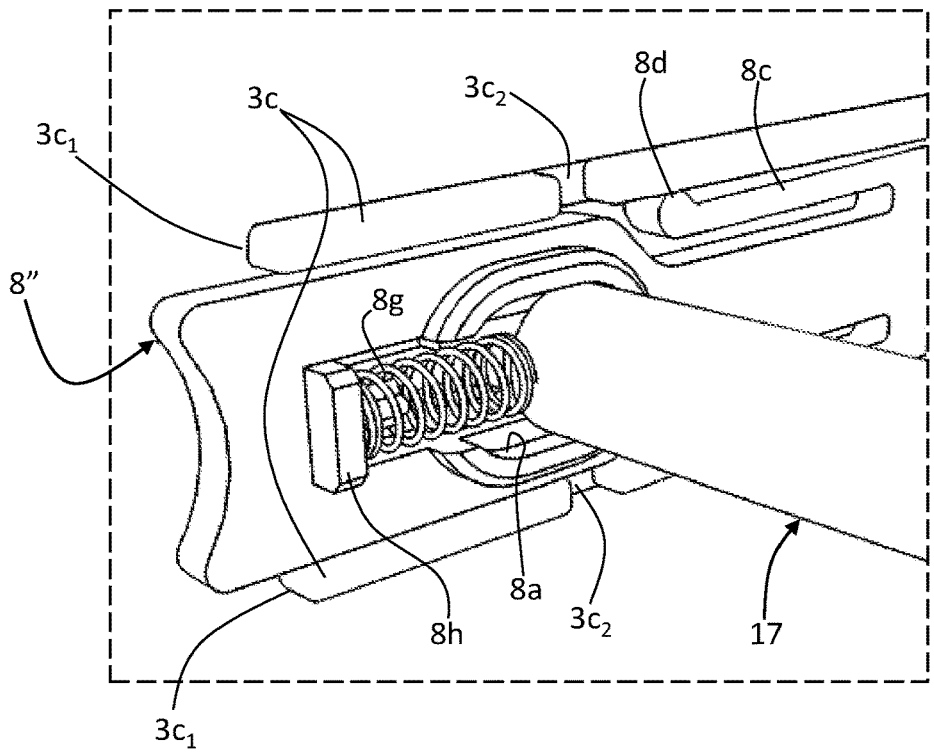
Figure 30:
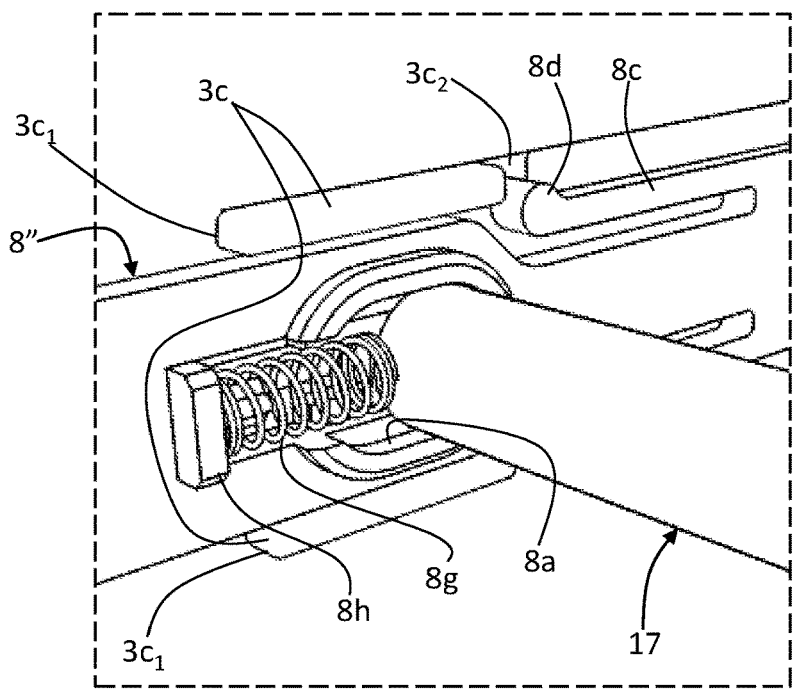
Figure 31:
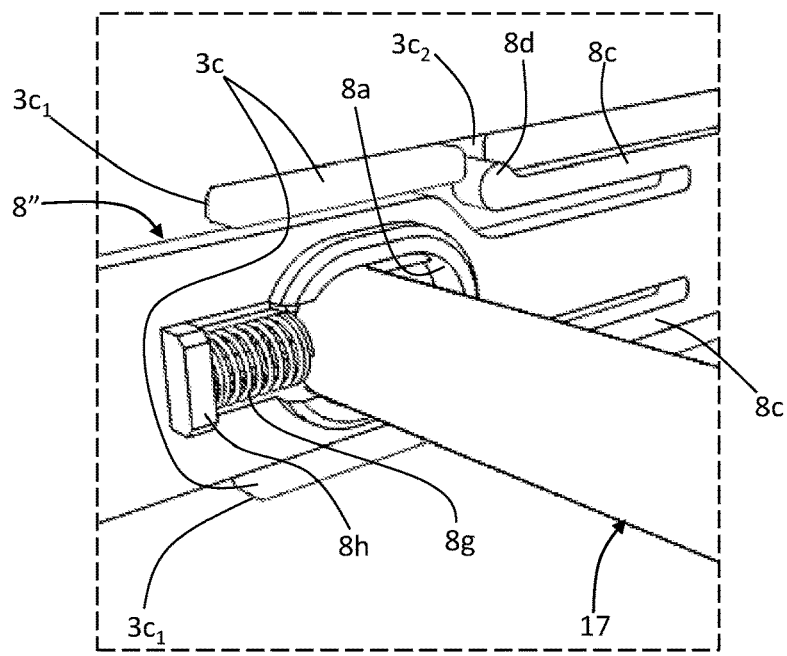
Figure 32:
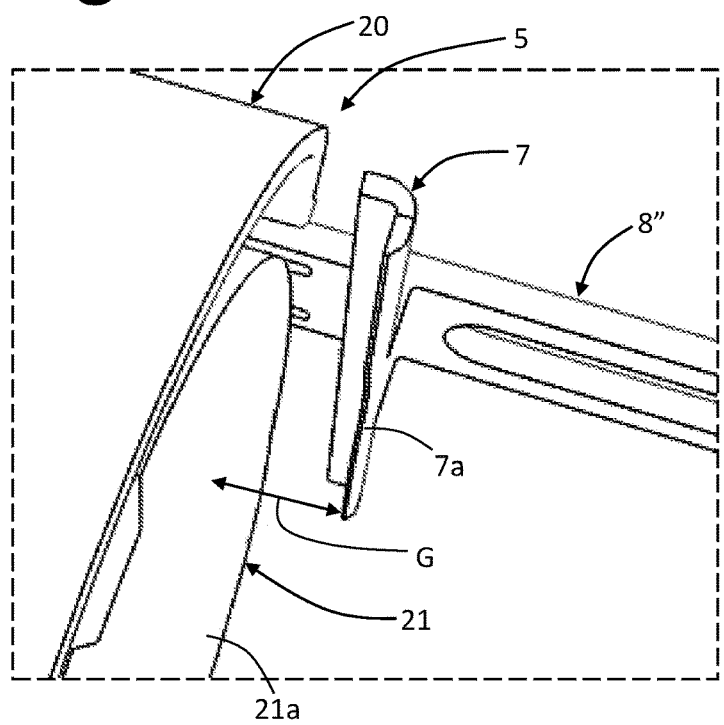

During the step of closing of the preparation chamber, the distance G remains the same, given that in this step the pin 17 pushes its two ends directly against the bottom of the seats 8*a* opposite to the springs 8*g*, thereby causing displacement of the injector 5, the guides 7, and the sliding elements 8" all together. At start of re-opening of the preparation chamber, the distance G initially remains substantially the same in so far as the reliefs 8*d* of the tabs 8*c* of each element 8" slide on the upper and lower surfaces, respectively, of the guides 3*c*, in a pre-loading condition of the tabs, as shown schematically in FIG. 29. At a certain point of recession of the injector, the reliefs 8*d* engage the interruptions $3c_2$, as shown schematically in FIG. 30, thanks to the elastic reaction of the tabs 8c. In this condition, movement backwards of the sliding elements 8" is temporarily arrested, whilst the injector 5 continues to recede. This is made possible by the oblong shape of the seat 8b and by the compression of the spring, which enable a certain translation backwards of the pin 17, notwithstanding arrest of the movement of the sliding elements 8, as shown schematically in FIG. 31. In this way, there is an increase of the distance G between the front wall 21a of the injector 5 and the part 7a of the guides 7 facing the above wall, as represented schematically in FIG. 32. This increased distance G guarantees dropping by gravity also of a possible swollen capsule, as in FIG. 25.

Figure 33:
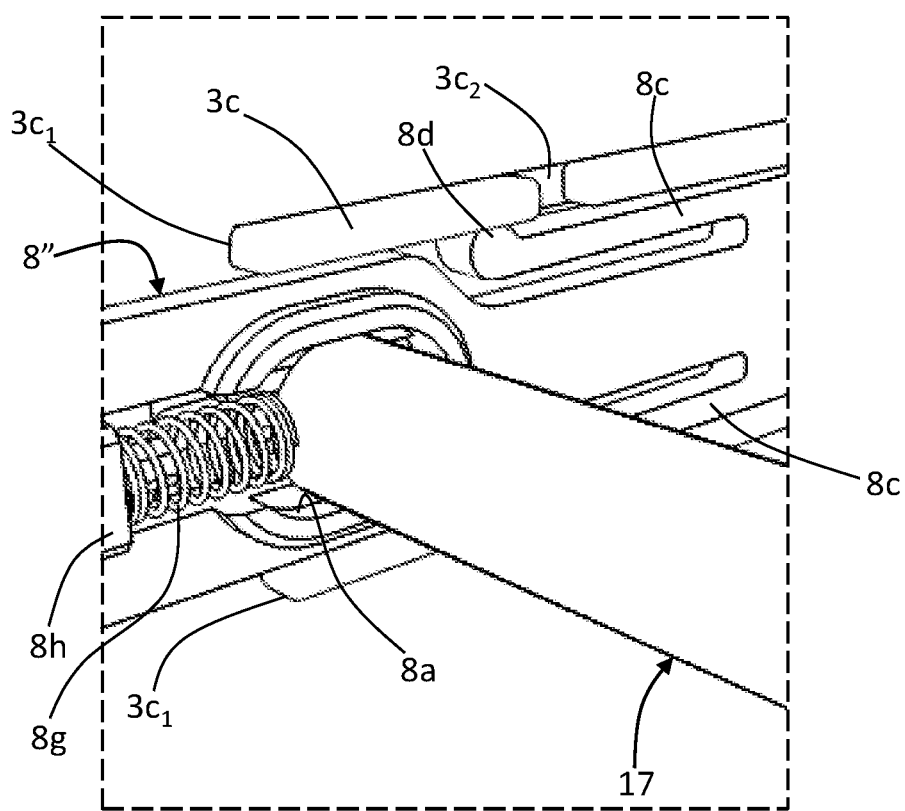

As the movement backwards of the injector 5 and of the pin 17 proceeds, and after the condition of maximum compression of the spring 8g has been reached, also the sliding elements 8" are forced to resume the corresponding movement backwards, thereby bringing about disengagement of the reliefs 8d from the interruptions $3c_2$, thanks to the capacity of bending of the tabs 8c, as shown schematically in FIG. 33. The springs 8g can thus bring back the elements 8 first into a position such that the ends of the pin 17 are in an intermediate position between the corresponding seats 8b, as shown schematically in FIG. 33, and then bearing upon the bottom of the seats 8a opposite to the corresponding spring 8g, i.e., in the starting condition illustrated in FIG. 27. Hence, in this position also the distance G between the guides and the front of the injector 5 returns to the initial one, of FIG. 28.

From the foregoing description, the characteristics of the present invention emerge clearly, as do likewise its advantages. According to one aspect, the guides for introduction of the capsule into the assembly are used as primary means for extraction of the capsule from the capsule-holder. Only in the case where, following upon preparation of the liquid product forming the beverage, softening and/or excessive deformation of the capsule were so substantial as to affect also its own flange partially, is there interaction between the bottom of the capsule and the ejector, which brings about expulsion of the capsule from the capsule-holder. It will be appreciated that the intervention of the ejector is delayed with respect to the movement of recession of the injector and of the insertion guides. According to a different aspect, the function of temporary recession of the guides described previously enables discharge of capsules that might have undergone, in the course of preparation of the liquid product, substantial modifications of their geometry, in particular in their front part.

Without prejudice to the principle of the invention, the details of construction and the embodiments may vary, even significantly, from what has been illustrated herein purely by way of non-limiting example, without thereby departing from the scope of the invention as defined in the annexed claims.

The function of temporary recession of the guides 7 described previously may be applied also to delivery assembly distinguished by systems of actuation of an ejector member different from the ones described previously, and possibly even in assemblies without an ejector member. Likewise, this function and the corresponding means linked thereto may be associated to guide elements functionally similar to those here designated by 7, but not directly or indirectly connected, for example, elements for guiding movement of an injector, such as the elements 8.

The slots previously designated by 8b can be configured in the form of surface recesses of the elements 8 for guiding movement of the injector 5.

The invention claimed is:

1. A machine for the preparation of a liquid product via a capsule which has a substantially cup-shaped body that houses a dose of at least one substance that can form the liquid product via a preparation fluid, the machine having a delivery assembly, which comprises a stationary structure and a passage for introduction of the capsule, the assembly moreover comprising:
   a preparation chamber that includes a first part of chamber, having a housing configured for receiving at least partially the capsule and enabling delivery of the liquid product from the preparation chamber, and a second part of chamber configured for introduction of the fluid into the capsule;
   an actuation system controllable for causing displacements of the second part of chamber with respect to the first part of chamber, between a spaced apart position and a close position;
   two first guide elements, secured at generally opposite side parts of the second part of chamber and fixed in motion with respect to the second part of chamber, the guide elements being configured for co-operating with a flange of the capsule for guiding the capsule towards a position that is substantially coaxial to the first part of chamber and to the second part of chamber, the first guide elements being designed to keep the capsule in a position centred with respect to the first part of chamber in the course of displacement of the second part of chamber towards the close position, at least as far as entry of the capsule into the housing of the first part of chamber;
   an ejector member, which is slidably mounted through a through opening of a bottom of the housing of the first part of chamber and is displaceable in the housing between a retracted position and an advanced position, in the course of displacement of the second part of chamber between the spaced apart position and the close position, respectively; and
   connection members, which connect the ejector member to the second part of chamber,
   wherein:
   the first guide elements are prearranged for interfering with the flange of the capsule in the course of displacement of the second part of chamber from the close position to the spaced apart position in order to extract the capsule from the housing of the first part of chamber;
   the connection members are configured in such a way that the ejector member brings about expulsion of the capsule from the housing of the first part of chamber if the first guide elements fail to extract the capsule from the housing.

2. The machine according to claim 1, wherein the connection members comprise:
   two second guide elements, generally transverse to the first guide elements and engaged in corresponding linear guides, defined on opposite side walls of the stationary structure for guiding the displacements of the second part of chamber between the spaced apart position and the close position, the second guide elements being fixed in motion with respect to the second part of chamber;

two lateral arms of the ejector member, each having a connection end slidably coupled to a corresponding second guide element.

3. The machine according to claim 2, wherein the connection ends of the lateral arms of the ejector member are coupled to the second guide elements for sliding between a first limit position and a second limit position, in the first limit position the second guide elements exerting a thrust on the lateral arms in the course of displacement of the second part of chamber towards the close position, thereby pushing the ejector member towards the corresponding retracted position, and in the second limit position the second guide elements exerting a pulling force on the lateral arms in the course of displacement of the second part of chamber towards the spaced apart position, thereby pulling the ejector member towards the corresponding advanced position.

4. The machine according to claim 3, wherein the second guide elements each have a slot or recess, engaged in which with possibility of sliding is a fixed pin belonging to the connection end of a respective lateral arm of the ejector member, the opposite ends of the slot or recess determining the two limit positions.

5. The machine according to claim 4, wherein the slots each have an intermediate elastic engagement element for defining a predetermined position of the fixed pins and hence of the lateral arms of the ejector member with respect to the second guide elements, in particular at the said first limit position, the fixed pins being releasable from the intermediate elastic engagement element in the course of said expulsion of the capsule from the housing of the first part of chamber performed via the ejector member.

6. The machine according to claim 2, wherein the first guide elements and the second guide elements are fixed with respect to one another.

7. The machine according to claim 2, wherein the second guide elements and the corresponding linear guides are configured for defining at least one position of arrest of the second part of chamber, corresponding to the spaced apart position with respect to the first part of chamber.

8. The machine according to claim 7, wherein each second guide element comprises at least one elastic engagement element that is able to co-operate with a corresponding recess or stop defined in the corresponding linear guides.

9. The machine according to claim 1, wherein each first guide element has at least one first portion that generally faces a front of the second part of chamber at a distance therefrom in order to define a space for receiving the flange of the capsule, and wherein the machine further comprises an arrangement for bringing about a momentary increase in the distance between said first portion of the first guide element and the front of the second part of chamber, in the course of displacement of the second part of chamber from the close position to the spaced apart position.

10. The machine according to claim 9, wherein said arrangement comprise:
a seat, associated to the first guide element and engaged in which with possibility of translation is an element for connection between the second part of chamber and the first guide element, and an elastic element that urges said connection element into a predefined position within said seat;
an elastic engagement element, which is associated to the first guide element and is able to engage with an interruption or recess, defined in the stationary structure, in the course of displacement of the second part of chamber from the close position to the spaced apart position.

11. A machine for the preparation of a liquid product via a capsule, the machine having a delivery assembly, which comprises a stationary structure and a passage for introduction of the capsule, the assembly moreover comprising:
a preparation chamber, which includes a first part of chamber, having a housing configured for receiving at least partially the capsule and enabling delivery of the liquid product from the preparation chamber, and a second part of chamber configured for introduction of a fluid into the capsule;
an actuation system controllable for causing displacements of the second part of chamber with respect to the first part of chamber between a spaced apart position and a close position;
two first guide elements, secured at generally opposite side parts of the second part of chamber and fixed in motion with respect to the second part of chamber, the first guide elements being configured for co-operating with a flange of the capsule for guiding the capsule towards a position that is substantially coaxial to the first part of chamber and to the second part of chamber, the first guide elements being designed to keep the capsule in a position centred with respect to the first part of chamber in the course of displacement of the second part of chamber towards the close position, at least as far as entry of the capsule into the housing of the first part of chamber,
wherein each first guide element has at least one first portion that generally faces a front of the second part of chamber at a distance therefrom in order to define a space for receiving the flange of the capsule,
wherein the machine further comprises an arrangement for bringing about a momentary increase in the distance between the said first portion of each first guide element and the front of the second part of chamber, in the course of displacement of the second part of chamber from the close position to the spaced apart position.

12. The machine according to claim 11, wherein the assembly moreover comprises:
an ejector member, which is slidably mounted through a through opening of a bottom of the housing of the first part of chamber and is displaceable in the housing between a retracted position and an advanced position, in the course of displacement of the second part of chamber between the spaced apart position and the close position, respectively;
connection members, which connect the ejector member to the second part of chamber.

13. The machine according to claim 12, wherein:
the first guide elements are prearranged for interfering with the flange of the capsule in the course of displacement of the second part of chamber from the close position to the spaced apart position in order to extract the capsule from the housing of the first part of chamber;
the connection members are configured in such a way that the ejector member brings about expulsion of the capsule from the housing of the first part of chamber if the first guide elements fail to extract the capsule from the housing.

14. The machine according to claim 12, wherein the connection members comprise
two second guide elements, generally transverse to the first guide elements and engaged in corresponding linear guides, defined on opposite side walls of the stationary structure for guiding the displacements of the second part of chamber between the spaced apart position and the close position, the second guide elements being fixed in motion with respect to the second part of chamber; and two lateral arms of the ejector member, each having a connection end slidably coupled to a corresponding second guide element.

15. The machine according to claim 14, wherein the connection ends of the lateral arms of the ejector member are coupled to the second guide elements for sliding between a first limit position and a second limit position, in the first limit position the second guide elements exerting a thrust on the lateral arms in the course of displacement of the second part of chamber towards the close position, thereby pushing the ejector member towards the corresponding retracted position, and in the second limit position the second guide elements exerting a pulling force on the lateral arms in the course of displacement of the second part of chamber towards the spaced apart position, thereby pulling the ejector member towards the corresponding advanced position.

16. The machine according to claim 15, wherein the second guide elements each have a slot or recess, engaged in which with possibility of sliding is a fixed pin belonging to the connection end of a respective lateral arm of the ejector member, the opposite ends of the slot or recess determining the two limit positions.

17. The machine according to claim 16, wherein the slots each have an intermediate elastic engagement element for defining a predetermined position of the fixed pins and hence of the lateral arms of the ejector member with respect to the second guide elements, the fixed pins being releasable from the intermediate elastic engagement element in the course of said expulsion of the capsule from the housing of the first part of chamber performed via the ejector member.

18. The machine according to claim 14, wherein the first guide elements and the second guide elements are fixed with respect to one another.

19. The machine according to claim 14, wherein the second guide elements and the corresponding linear guides are configured for defining at least one position of arrest of the second part of chamber, corresponding to the position where the second part of chamber is set at a distance from the first part of chamber.

20. The machine according to claim 11, wherein said arrangement comprises:
 a seat, associated to the first guide element and engaged in which, with possibility of translation, is an element for connection between the second part of chamber and the first guide element, and an elastic element that urges said connection element into a predefined position within said seat; and
 an elastic engagement element, which is associated to the first guide element and is able to engage with an interruption or recess, defined in the stationary structure in the course of displacement of the second part of chamber from the close position to the spaced apart position.

* * * * *